(12) United States Patent
Cekorich et al.

(10) Patent No.: US 6,778,720 B1
(45) Date of Patent: Aug. 17, 2004

(54) DUAL SLOPE FIBER OPTIC ARRAY INTERROGATOR

(75) Inventors: Allen Curtis Cekorich, Northridge, CA (US); Ira Jeffrey Bush, Los Angeles, CA (US)

(73) Assignee: Optiphase, Inc., Van Nuys, CA (US)

(*) Notice: Subject to any disclaimer, the term of this patent is extended or adjusted under 35 U.S.C. 154(b) by 209 days.

(21) Appl. No.: 10/113,613

(22) Filed: Apr. 2, 2002

(51) Int. Cl.⁷ .............................................. G02B 6/42
(52) U.S. Cl. .................... 385/15; 356/463; 356/464; 356/345; 356/359; 359/93
(58) Field of Search ................. 385/15; 356/463, 356/464, 345, 359; 359/193

(56) References Cited

U.S. PATENT DOCUMENTS

| | | |
|---|---|---|
| 4,707,136 A | 11/1987 | Kim |
| 4,728,192 A | 3/1988 | Shaw et al. |
| 4,779,975 A | 10/1988 | Kim |
| 4,789,240 A | 12/1988 | Bush |
| 4,883,358 A | 11/1989 | Okada |
| 4,957,362 A * | 9/1990 | Peterson ............... 356/5.14 |
| 5,289,257 A | 2/1994 | Kurokawa et al. |
| 5,675,674 A | 10/1997 | Weis |
| 5,903,350 A | 5/1999 | Bush et al. |
| 5,959,294 A | 9/1999 | Green et al. |
| 6,097,486 A * | 8/2000 | Vakoc et al. ............. 356/477 |
| 6,122,057 A | 9/2000 | Hall |
| 6,154,308 A * | 11/2000 | Hall ...................... 359/325 |
| 6,252,656 B1 | 6/2001 | Wu et al. |
| 6,600,586 B1 * | 7/2003 | Hall ...................... 398/207 |

* cited by examiner

*Primary Examiner*—Karl D. Frech
*Assistant Examiner*—Daniel A. Hess
(74) *Attorney, Agent, or Firm*—Michael Blaine Brooks, P.C.; Michael B. Brooks

(57) ABSTRACT

An apparatus and method is presented presented to provide wide dynamic range measurements of the input phase to a time domain multiplex interferometer array using a dual slope modulation method for interrogation. Features of the present invention include a topology capable of using only single mode fiber components and self-correcting processing approaches that reduce measurement errors providing high accuracy measurements and significantly reducing the cost of interrogation.

37 Claims, 16 Drawing Sheets

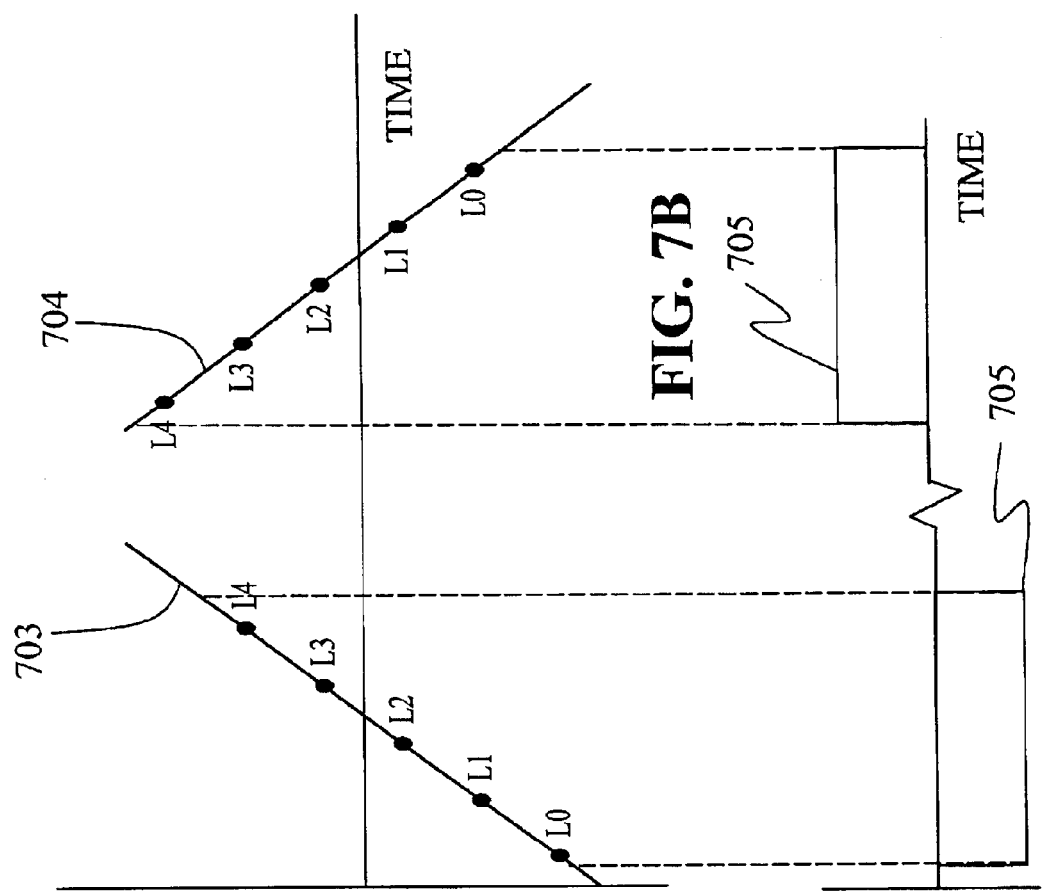
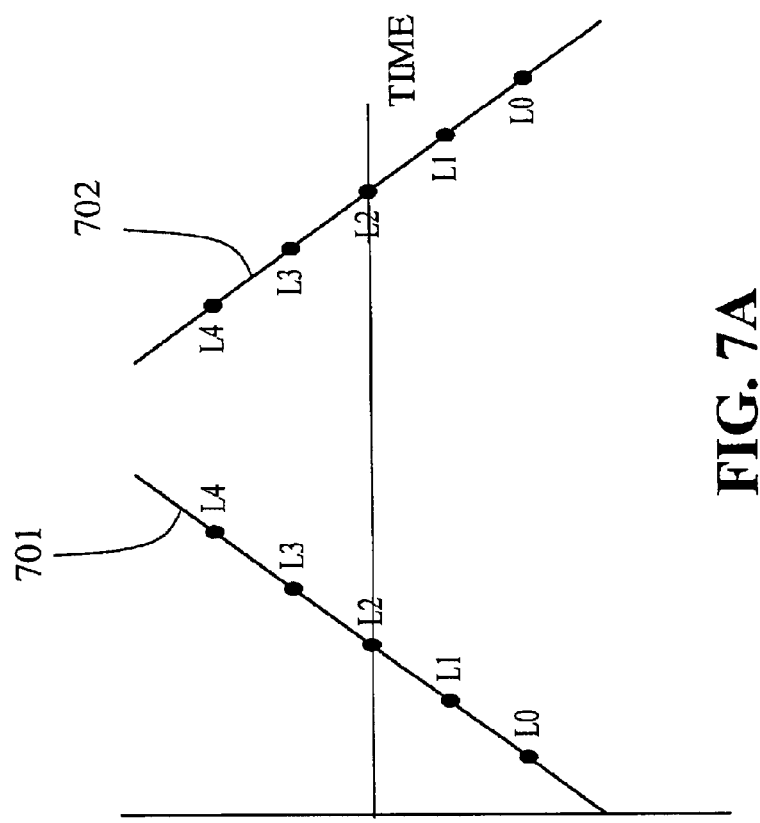
FIG. 7A
FIG. 7B
FIG. 7C

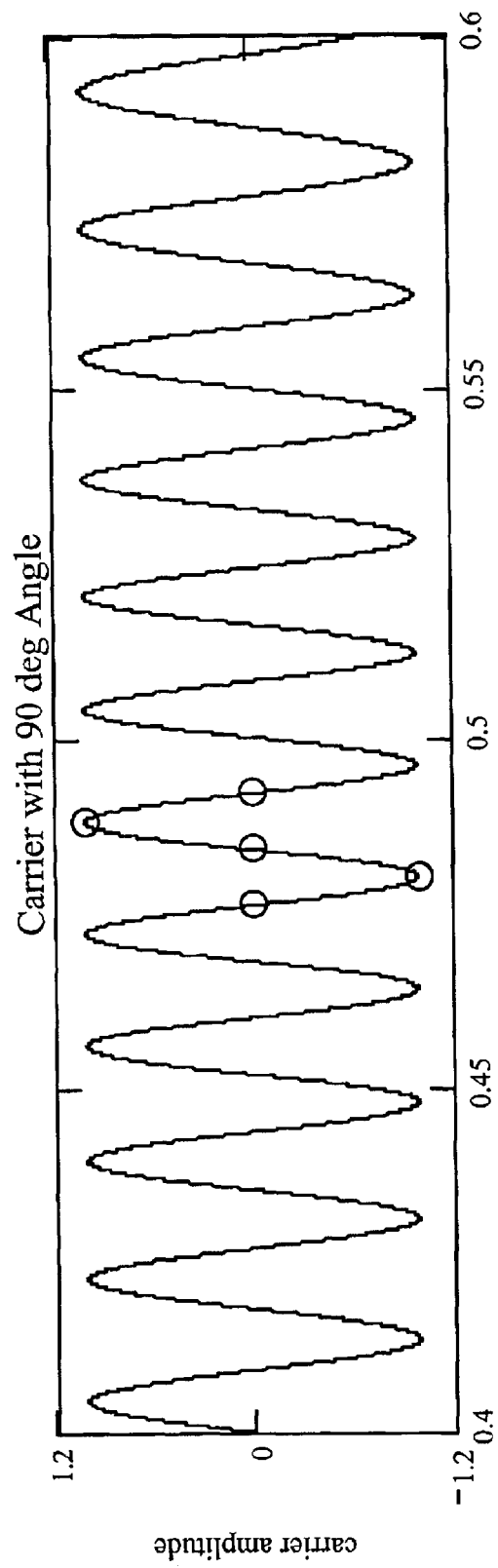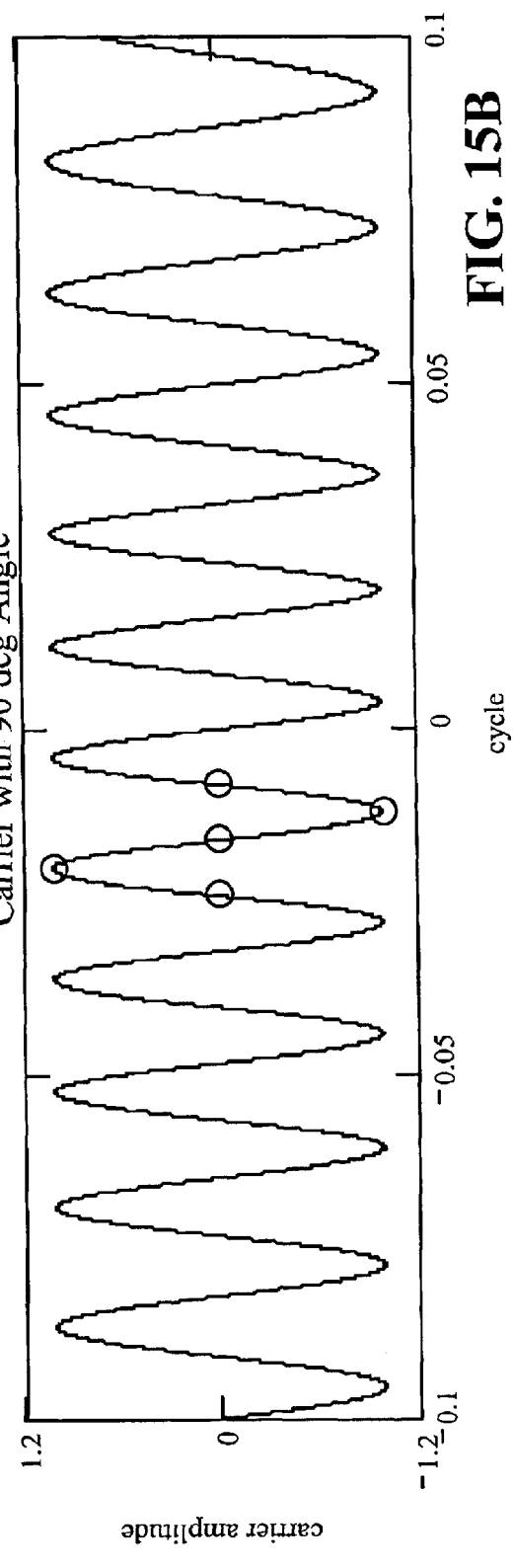

DUAL SLOPE FIBER OPTIC ARRAY INTERROGATOR

FEDERALLY SPONSORED RESEARCH

The invention was made with Government support under N00014-98-C-0221 awarded by the Department of the Navy. The Government has certain rights in the invention.

BACKGROUND

1. Field of the Invention

The present invention relates generally to fiber-optic interferometric sensors and especially to apparatuses and methods for measuring the input phase shift between two interfering waves where the phase shift has been summed with a modulation phase shift, whose amplitude and phase may be precisely controlled such that subsequent demodulation provides a high accuracy measure of the input phase, being especially useful when multiple element sensor arrays are interrogated using Time Division Multiplexing (TDM) techniques.

2. Description of Prior Art

Fiber optic interferometers are implemented in sensors and sensor arrays to measure physical properties such as acoustic level, pressure, acceleration, temperature, electric and magnetic fields. Numerous techniques described in the literature have been applied to the design of interferometric fiber sensor array systems. A principal objective of such designs is to obtain high quality measurements of the desired physical parameter. A second objective is to evolve designs that are cost effective without compromising the quality of the measurement data.

Regarding TDM sensor array approaches, general design practices involve a passive remote sensor array comprised of path mismatched Single Mode Fiber (SMF) interferometers and an "interrogator." The interrogator contains the active components. A typical interrogator design contains elements that optically feed the sensor array, and elements which process the optical signals returning from the array.

Interrogator elements which feed the array include: (1) a CW laser; (2) an optical pulser; and (3) an optical phase or frequency modulator which is sometimes housed in a path mismatch compensating interferometer, where timing and control electronics are used to sequence the pulses and control the modulation signal. Interrogator elements which process the array returns include: (1) a polarization diversity receiver to insure high interferometric visibility; (2)signal conditioning and sampling electronics; (3) demodulation electronics; and (4)timing electronics to coordinate the sampling process of the TDM returns.

The interrogator feed elements, due to functional necessity, are highly specialized. In general, TDM interrogation mandates that high-extinction, precisely modulated optical pulses (typically 2 µsec or less in duration) be created and submitted to the sensor array. In order to produce the phase modulation, high frequency Integrated Optic Chip (IOC) phase modulators which implement Polarization Maintaining (PM) fiber inputs become the device of choice. Since the modulation is created subsequent to the optical pulse creation, the necessity of polarized operation is also extended to the pulser, which typically is also an IOC device. Here a highly specialized dual Mach Zehnder element is used to meet the high optical extinction requirements, which are typically 100,000:1 or higher. Additionally specialized servo electronics are required for the integrated optic pulser to insure it is maintaining a high optical extinction. If the interrogator design implements a compensating interferometer, which most do, then this element also requires PM input splitting components.

The use of PM fiber, customized integrated optic components and specialized electronic circuitry tend to drive the manufacturing costs of interrogators to high levels. These high costs present a disadvantage to general industry acceptance.

It is an aim of the present invention to reduce the inherent design cost of interrogators without compromising measurement performance.

SUMMARY

The present invention is an interrogator with reduced design complexity and specialization. Features of the present invention include a topology that need only use single mode fiber (SMF) components and in the preferred embodiment of the modulation, use a fiber stretcher and a Faraday Rotating Mirror (FRM) within a compensating interferometer. Additionally, the preferred embodiment uses self-correcting processing approaches that reduce modulation errors to provide high accuracy measurements and significantly reduce the cost of interrogation. A general objective of the present invention is to reduce the complexity and cost of interrogators for multi-channel fiber sensor systems.

The present invention comprises an apparatus and method for low-cost TDM interrogations within high performance fiber interferometric sensor array systems. The invention uses a new "dual slope" modulation/demodulation approach which is capable of high performance TDM interrogation without the requirement of high frequency or polarization-maintaining modulators. This resulting topology in turn enables the optical design of the interrogator to be completely free of costly polarization-maintaining elements.

For example, the preferred embodiment of the interrogator feed elements consist of a CW laser diode which is input to a SMF fiber coupled Acousto-Optic pulser, which is then input to a SMF compensation interferometer containing a delay fiber with reflective termination in one leg and a SMF wrapped piezoelectric fiber stretcher (modulator) with FRM termination in the other leg. Such an assembly for the interrogation feed can be manufactured at significantly lower relative cost than prior art configurations using PM elements with integrated optic modulators and pulsers.

The key object to this invention is to create alternating and opposite modulation phase slopes such that each has a linear excursion of 2 pi radians within the duration of an optical pulse used to interrogate the sensor array. The return optical pulse from each sensor in the array is sampled five times for each slope such that each sample represents a phase slope excursion of $\pi/2$. The five-samples-per-pulse process embodiment, by way of example and not limitation is summarized as follows:

(a) S0, S1, S2, S3 and S4 are samples taken within a pulse length from the modulated up slope;

(b) S5, S6, S7, S8 and S9 are samples taken within a successive pulse length from the modulated down slope;

(c) Quadrature terms generated from the samples are from the upslope and corresponding phase are:
$\cos(R_{PSS})=2S2-S4-S0$;
$\sin(R_{PSS})=2(S1-S3)$; and result in a fringe-corrected output phase for the positive slope samples, $R_{PSS}$:

$$R_{PSS}=\tan^{-1}(\sin(R_{PSS})/\cos(R_{PSS})+\text{fringe});$$

(d) Quadrature terms generated from the samples are from the downslope and corresponding phase measured are
$\cos(R_{NSS})=2S7-S5-S9$;

$\sin(R_{NSS})=2(S8-S6)$; and result in a fringe-corrected output phase for the negative slope samples, $R_{NSS}$:

$$R_{NSS}=\tan^{-1}(\sin(R_{NSS})/\cos(R_{NSS})+\text{fringe});$$

(e) The truer measure of the output phase signal, R(t), during the modulation cycle cancels any modulation artifacts and is the sum of the above two derived measurements $$R(t)=\tfrac{1}{2}(R_{PSS}-R_{NSS});$$

(f) The modulation phase error, $W_e$, is used as a modulation feedback term to correct the time sequencing of the slopes and is given by $$W_e=\tfrac{1}{2}(R_{PSS}-R_{NSS});$$

(g) The modulation amplitude error, EM, is used as a modulation amplitude feedback correction term to insure the sampling sequence S0–S4 and S5–S9 occur at precise intervals of π/2. The measure of this error is quadrant sensitive and is given for all four positive slope cases, $EM_P$, by $$EM_{P,0}=S1-S2+S3-S4, \text{ quadrant 0;}$$

$$EM_{P,1}=S0-S1+S2-S3, \text{ quadrant 1;}$$

$$EM_{P,2}=-EM_{P,0}=-S1+S2-S3+S4, \text{ quadrant 2; and}$$

$$EM_{P,3}=-EM_{P,1}=-S0+S1-S2+S3, \text{ quadrant 3;}$$

and all four negative slope cases, $EM_N$, by:

$$EM_{N,0}=-S5+S6-S7+S8, \text{ quadrant 0;}$$

$$EM_{N,1}=-S6+S7-S8+S9, \text{ quadrant 1;}$$

$$EM_{N,2}=-EM_{N,0}=+S5-S6-S7-S8, \text{ quadrant 2; and}$$

$$EM_{N,3}=-EM_{N,1}=+S6-S7+S8-S9, \text{ quadrant 3.}$$

An appreciation of the present invention and a more complete understanding of its structure and method of operation may be had by studying the following description of the detailed description with preferred embodiment and by referring to the accompanying drawings.

BRIEF DESCRIPTION OF THE DRAWINGS

For a more complete understanding of the present invention and for further features and advantages, reference is now made to the following description taken in conjunction with the accompanying drawings, in which:

FIGS. 7A–7C illustrate the sampled levels of a centered sine modulation, a shifted sine modulation and the resulting square wave respectively.

FIGS. 15A–15B illustrate the sampled carrier with a phase error of 0.016 cycle for both points 0 and for 0.5 respectively.

DETAILED DESCRIPTION OF THE PREFERRED EMBODIMENT

Figure 1:
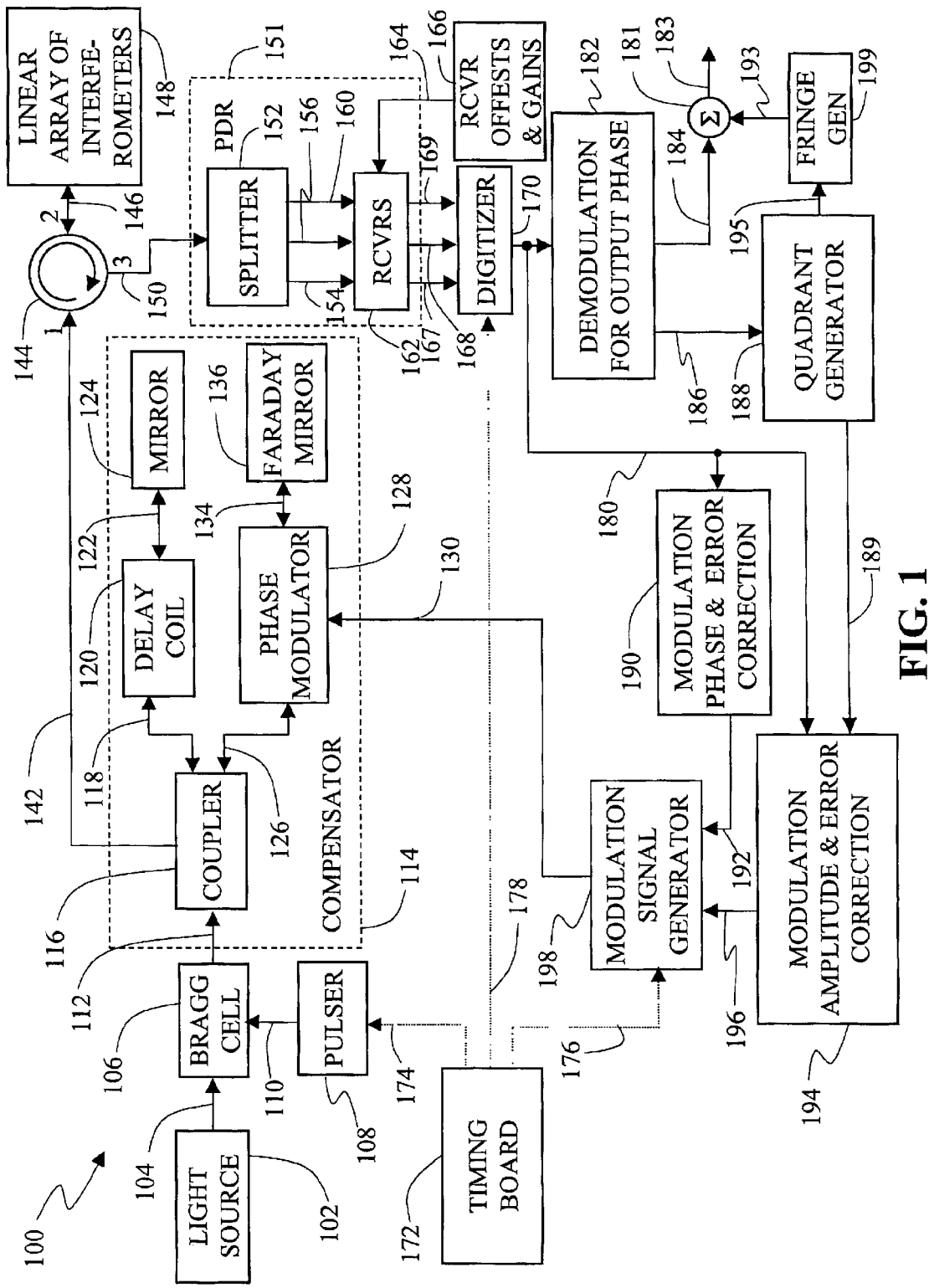
FIG. 1 is a functional block diagram of the present invention.

A laser with Single Mode Fiber (SMF) output feeds a fiber-coupled acousto-optic (Bragg) cell that is used to create an optical pulse. This pulse feeds what can be termed a compensating interferometer comprised of a SMF fiber Michelson configuration with a resulting path mismatch substantially equal to the optical pulse width. One leg of the compensator has a SMF fiber stretcher, as a modulator, driven with a waveform that creates a dual slope, or dual ramp, modulation. In the preferred embodiment of the present invention, a sine wave drive signal is applied to the modulator. Alternative embodiments include clipped sine waves, triangular waves including sawtooths, substantially square waves with finite linear transitions, and other waveforms producing substantially linear zero crossings. The modulator is terminated preferably with a FRM to counter any birefringence modulation experienced by the modulation process, otherwise, in the face of negligible birefringence, a reflector may be used. The other leg of the compensating fiber is comprised of SMF terminated with a reflector. An alternative embodiment of the compensating interferometer comprises a SMF fiber Mach Zehnder configuration.

The output of the compensating interferometer comprises two concatenated or otherwise contiguous, pulses that together span twice the width of the original pulse. The frequency and drive level of the modulator along with the delay caused by the compensator causes the optical phase difference between the two pulses to be substantially larger than 2π radians during the maximal slope portion of the dual slope drive to the modulator.

The dual pulses, as output of the compensating interferometer, are directed to a fiber sensor array that is comprised of fiber interferometers spaced so that each successive interferometer delays the first pulse by one pulse width so that upon exiting the interferometer, it will overlap and interfere with the second pulse. Numerous topologies exist for fiber sensor arrays. Traditional approaches include: (1) fiber string with partial reflectors spaced at half the pulse width (infinite impulse type); (2) Mach Zehnder interferometers with path mismatch equal to the pulse width using a tapped telemetry architecture; and (3) Michelson interferometers with path mismatch equal to the pulse width using a tapped telemetry architecture.

The resulting returns from each sensor cause the two pulses from the compensator to now be superimposed and cause modulated interference. The sensor information appears as Phase Modulated sideband information to the modulation.

Multi-channel demodulation is accomplished by the dual slope method and apparatus of the present invention. The preferred embodiment of the dual slope apparatus of the present invention 100 is disclosed in FIG. 1. A Distributed Feedback Diode (DFD) laser is used as the light source 102 principally because its coherence length supports the interference of reflected array pulses within the system.

This continuous light 104 is turned into a series of pulses 112 by using a Bragg Cell pulser 106. The Bragg Cell 106 passes light when a RF tone burst 110, having a duration of the desired optical pulse width, is applied to the crystal. The RF tone burst is applied by the pulser electronics 108 which are activated by a logic pulse 174 from the Timing Board 172.

Each optical pulse 112 enters the compensator 114 through the coupler 116 and is divided into two pulses, the first pulse 126 going to a phase modulator 128 and a second pulse 118 going to a delay coil 120. The first optical pulse 126 passes through the phase modulator 128, a device whose optical path length depends upon the voltage level of the modulation driver. The first pulse 126 reflects back 134 from a FRM 136 and accordingly passes a second time through the phase modulator 128, where the FRM 136 is used to provide an orthogonal polarization reflection. As such, this second pass enables the phase modulator 128, now a double-pass modulator, to supply twice the radians per volt phase modulation as a single-pass modulator. The delay arm optical pulse path has a mirror 124 at its end that reflects light back 122 through the delay coil 120 and on to the coupler 116. The total travel distance of a pulse traveling the delay arm optical path insures that the pulse is delayed by one pulse width from the pulse in the modulator arm when the two pulses exit the coupler 116. Other arrangements of the compensator can be used such as having a modulator in both arms to give a push-pull configuration. The mirror 124 can be equally replaced with a second FRM. The FRM 136 can be replaced with a mirror when the phase modulator 128 does not produce significant birefringence modulation in the high slope modulation region.

The FRM 136 is used to minimize the effects on the system due to any birefringence modulation created by the phase modulator 128. Because the input optical pulse 112 travels through the delay arm of the compensator an extra pulse width compared to the modulator arm, two pulses emerge 142 from the coupler 116 due to the one pulse width relative delay that the delay coil 120 provides.

The pulse pair 142 is directed by way of an optical circulator 144, a coupler or other bi-directional coupling device to the input 146 of one or more, and in the preferred embodiment, a linear array of interferometers 148 to be recombined at each interferometer and returned to the input 146 to the circulator 144. The circulator 144 routes the array pulse train 150 to an optical receiver, where the preferred embodiment utilizes a Polarization Diversity Receiver (PDR) 151 that splits incoming light signals into a plurality of optical paths with an optical splitter 152, such that each can be filtered with differently oriented polarizers prior to photo-electric conversion to the effect that at least one light path offers a high interferometric visibility. The preferred PDR configuration is three optical paths 154, 156, 160 each with polarized receiver orientated at 120 degrees with respect to its adjacent receiver 162. The light from all three receivers of the PDR 151 is converted to voltages at the receivers 162 and the three converted signals 167, 168, 169 are routed to the digitizer 170. The programmable settings for receiver 162 offsets and gains are sent 164 from the DAC module 166.

The phase modulator 128 is driven by a synthesized dual slope modulation signal preferably formed by a table of values strobed into a DAC portion of a modulation signal generator 198 by the timing board signal 176. In the preferred embodiment, the modulation signal generator is comprised of a digital form of the selected waveform, a digital-to-analog converter, with conditioning filters as required to provide an adequate modulation drive. The synthesized dual slope voltage is then amplified and low pass filtered within the modulation signal generator 198 before driving the phase modulator 128 by the output 130. In the preferred embodiment, this synthesized sine signal is by necessity synchronous with the pulser 108 and the A/D strobes of the receiver signals at the digitizer 170. The Timing Board 172 maintains the timing by starting with a system clock and dividing down into the various system-timing clocks. The DSTROBE signal 178 drives the receiver A/D conversion (digitizer) strobes, the DAC signal 176 drives the dual slope modulation D/A strobes, and the SWITCH signal 174 drives the Bragg Cell pulser 108 electronics.

In the preferred embodiment, the timing is programmable. The pulse frequency is set by the SWITCH pulse 174 and is twice the frequency of the digital portion of the modulation signal generator 198. The modulation DAC update strobe-176 is a multiple of the modulation drive frequency 130 to give the many steps used to synthesize the modulation drive 130. The digitizer strobe 178 is activated every switch period with a train of strobes separated by one-fifth the modulation pulse width 174 with the minimum number of repetitions set to five times the number of sensors in the array. There is also an initial delay before activating the digitizer strobes 178 to align the sampling with each array pulse train.

Demodulation is accomplished by the demodulation circuitry 182 typically being DSP based, where background processing is employed to continually monitor the digitized levels from the PDR receivers, so as to insure that a receiver channel with high interferometric visibility is selected for the demodulation calculation from among the candidate receiver channels. The receiver selected can be different for each channel and can change for any individual channel according to environmental changes to the sensor array, The phase angle from each sensor 184 is sent to the host computer (not shown) for storage and display. A quadrant generator 188 supports 189 the modulation amplitude and error correction 194. Samples {S0, S1, S2, S3, S4, S5, S6, S7, S8, S9} 180 are provided to both the modulation amplitude and error correction 194 and the modulation phase and error correction 190. From the modulation phase and error correction 190 and the modulation amplitude and error correction 194, the modulation signal is generated by the modulation signal generator 198.

In the preferred embodiment, a fringe generator 199 is implemented by reading 195 successive demodulated cycle quadrant values from the quadrant generator 188 to make a determination of fringe crossings where such determination updates an integer fringe counter. The output of the fringe generator is the fringe count multiplied by $2\pi$ and is designated as fringe 193. The demodulated output signal 184, is comprised of the summation of phase determined on the unit circle 183 and the fringe 193.

Dual Slope Demodulation

Figure 2:
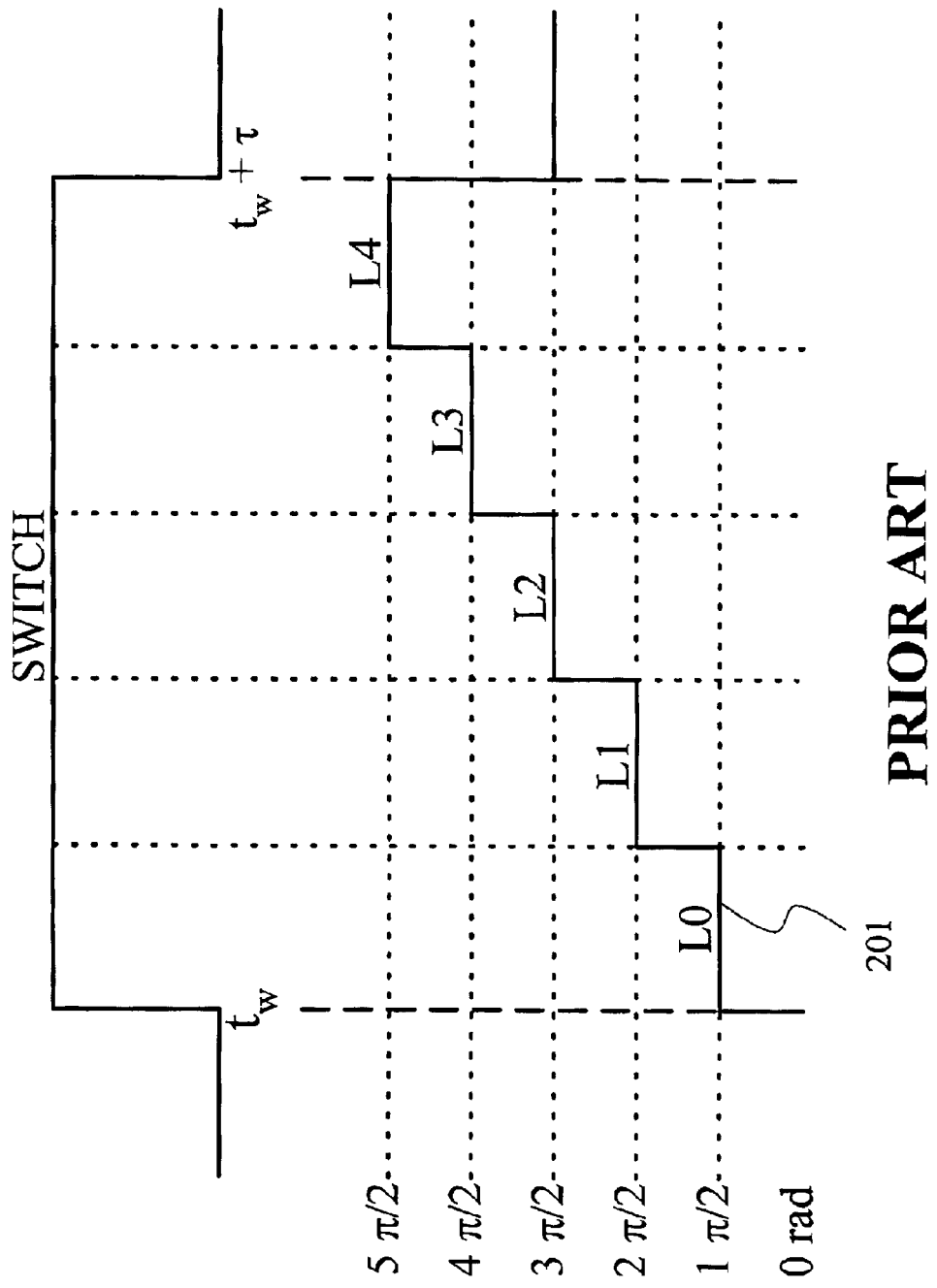
FIG. 2 illustrates prior art disclosing five active modulation steps used in an interrogator based upon a discrete serrodyne phase modulation.
Figure 3:
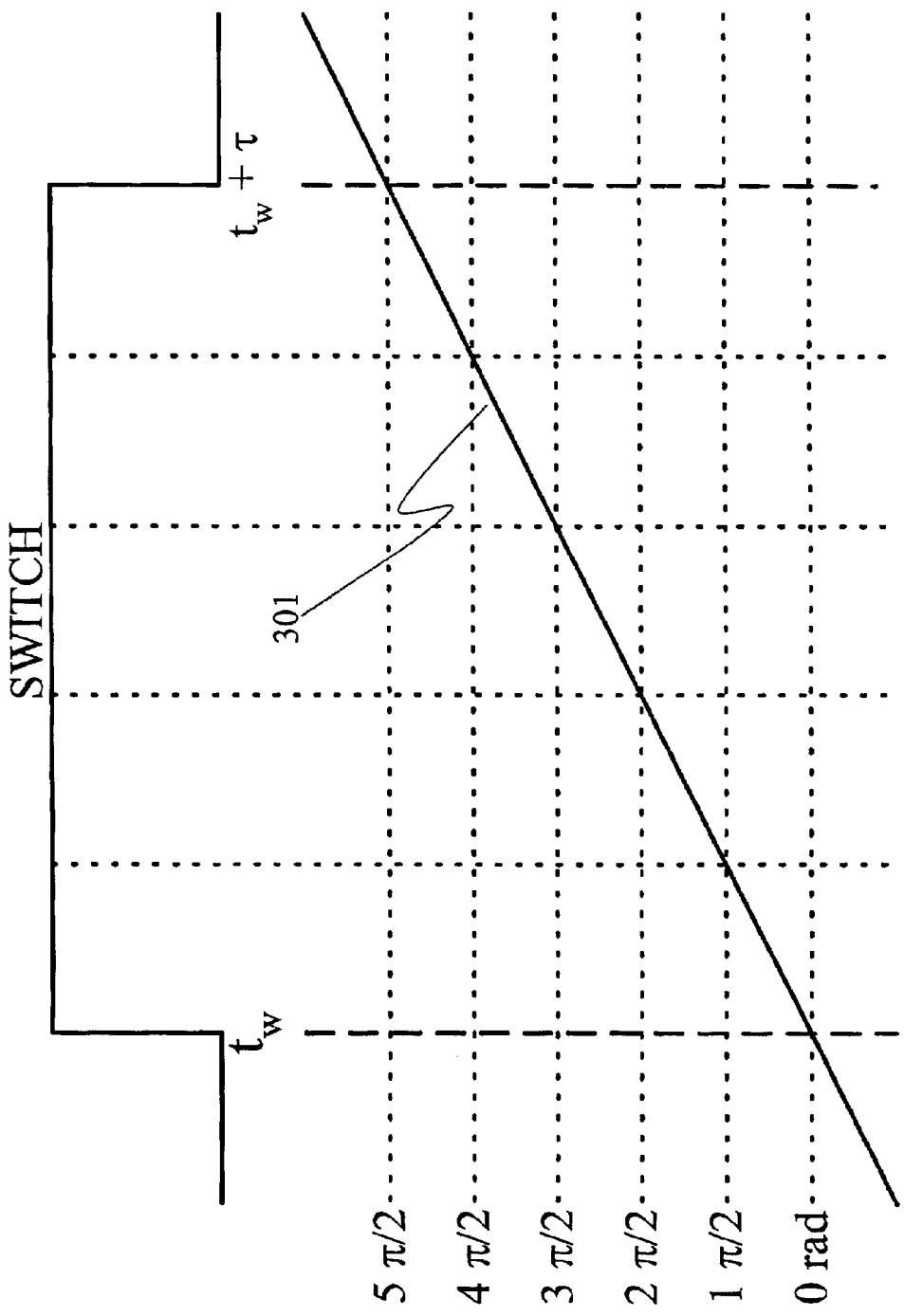
FIG. 3 illustrates the present invention exploiting continuous modulation.

Modulation depth adjustment and the generation of a modulation slope are an inherent part of phase generated carrier systems. The prior art illustrated by FIG. 2 illustrates the modulation steps of an interrogator based upon a discrete serrodyne phase modulation of five active modulation steps L0 through L4 201. The five active steps occur during one $\tau$ period of the optical pulse. The fifth level, L4, is a repetition modulo $2\pi$ of level L0 and is required to actively adjust the modulation depth. FIG. 3 illustrates the present invention innovating over the prior art by exploiting continuous rather than discrete serrodyne modulation. The present invention essentially replaces the above modulation levels L0 through L4 of the prior art illustrated in FIG. 2 with a continuous ramp 301 with a slope of $\pi/2$ radians per $\tau/5$ seconds. The modulation ramp can be introduced into one or both arms of the compensator 114 and results in a time dependent phase shift during each optical pulse.

In order to provide effective modulation, the phase modulation slope may be adjusted by using a servo control loop. The error-signal pick-off for this servo loop may be derived by observing the sampled sensor return signals, where it is required that at least five samples be taken of each sensor return. The ramp is repeated during every optical interrogation pulse making it periodic with the array interrogation rate in the prior art. The step modulation of the prior art is equal to the effectiveness of ramp modulation when a wide bandwidth modulator is present in the compensator. However, if a low bandwidth modulator such as a fiber wound piezoelectric transducer (PZT) is to be used in the compensator, there are advantages to ramp modulation. A compensator built using a PZT modulator as a phase modulator 128 has a lower loss, increasing the optical power available to the array. A fiber wound PZT modulator 128 also costs less than a typical Lithium Niobate device and can use less expensive single mode fiber in the compensator. The main design consideration of using a PZT modulator 128 in place of a Lithium Niobate device, for example, is that the PZT modulator 128 is principally a limited bandwidth device. Thus, a sine modulation tone, generated with the proper amplitude and phase to appear as a ramp during the optical pulse time, is implemented in the present invention in order to exploit the benefits of the PZT modulator 128.

Figure 4:
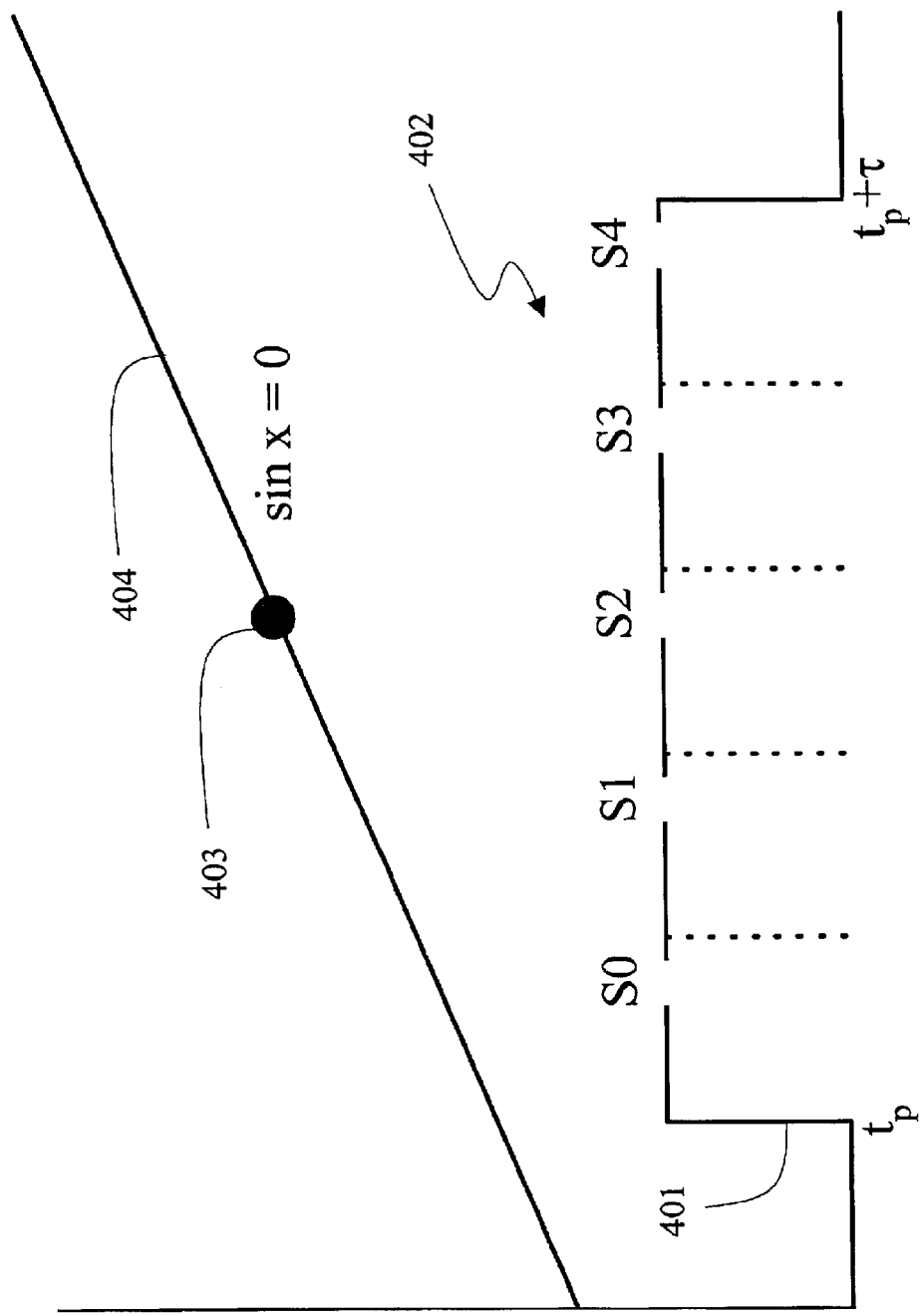
FIG. 4 illustrates the sensor's power being centered about the zero crossing of the sine modulation in the preferred embodiment of the present invention.

Referring to FIG. 4, the sine modulation is only useful when it can be made substantially linear over an optical pulse period 401. This desired linearity requires that the samples 402 of a sensor's power be centered about the zero crossing 403 of the sine modulation 404. This centering is accomplished by adjusting the phase of the PZT modulation until the PZT delay time centers the samples on the modulation sine zero crossing. Accordingly, this centering will align the sample weighted center of the samples of the optical pulse with the phase modulation zero crossings as illustrated in FIG. 5 where multiple pulse periods 401 are shown time centered with the sine modulation 404 multiple zero crossings 403.

Figure 5:
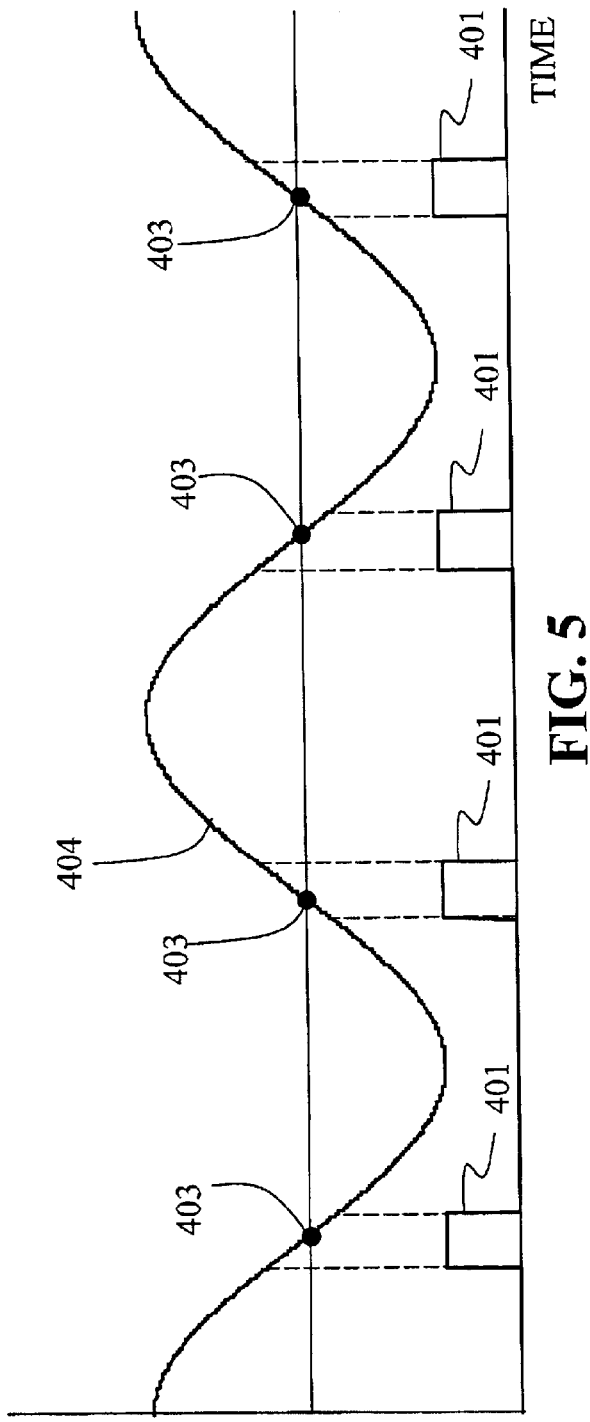
FIG. 5 illustrates multiple pulse periods time-centered with the sine modulation multiple zero crossings.
Figure 6:
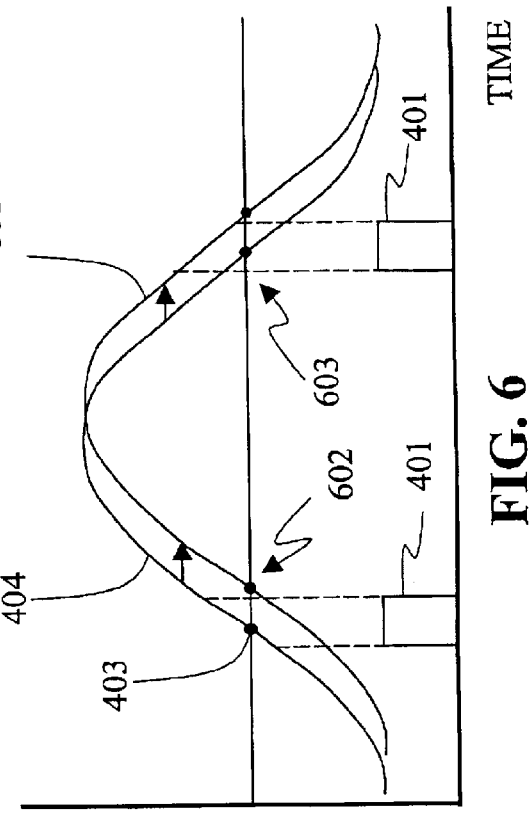
FIG. 6 illustrates that samples within a pulse period, when compared to the centered modulation sine measure lower values during the positive slope and higher values during the negative slope.

FIG. 6 illustrates the situation that should the phase of the modulation shift the modulation sine to the right 601, the samples within a pulse period, when compared to the centered modulation sine 403 of FIG. 5 would measure lower values during the positive slope 602 and higher values during the negative slope 603. The induced modulation levels for both slopes are shown in FIG. 7A. The phase of the modulation is set properly relative to the pulse period in this illustration so that the positive slope modulation levels 701 match the negative slope modulation levels 702.

FIG. 7B shows the results on the slope levels when the phase of the modulation shifts the dual slope modulation to the right. The positive slope modulation levels 703 decrease and the negative slope modulation levels 704 increase. In this case, the positive slope demodulation will return a smaller value of the sensor phase 184, R, than the negative slope demodulation. This result can be understood by comparing the demodulation during the phase slopes of FIG. 7A and the demodulation during the phase slopes of FIG. 7B. From FIG. 7A, the sample of the optical pulse for each modulation level L is proportional to:

$$\cos(R+L) \text{ yields } R. \qquad [1]$$

For the positive slope in FIG. 7B, the sample of the optical pulse for each modulation level L is now:

$$\cos[R+(L-dL)]=\cos[L+(R-dL)] \text{ yields } R-dL. \qquad [2]$$

and for the negative slope in FIG. 7B:

$$\cos[R+(L+dL)]=\cos[L+(R+dL)] \text{ yields } R+dL. \qquad [3]$$

Thus, the results illustrated in FIG. 7A, where the correct modulation phase is centered for pulse periods 401, yields the correct sensor angle 184, R, for the modulation level sequence L. The positive slope of the FIG. 7B will offset each modulation level in the sequence by a constant negative amount of magnitude dL, which can be transferred to the sensor angle and so decrease it. The negative slope of FIG. 7B offsets each modulation level in the sequence by the same positive amount of magnitude dL, which will increase the sensor angle. As illustrated in FIG. 7C, the result is that an error in the phase of the modulation shows up as a square wave of height dL 705 of R at the modulation frequency.

A signed error proportional to the phase of the modulation error can be obtained by subtracting the demodulated angle of the negative slope from the demodulated angle of the positive slope. This error is used in the present invention to servo the phase of the modulation to the optimum value, that is a modulation with a sine zero crossing centered with respect to the pulse period. Also, an error free measure of R can be obtained in all circumstances by adding the positive and negative slope demodulated angles. Because high slew rates of R will cause its measured value at the positive slope relative to the negative slope to change, the present invention implements filtering of the error term to minimize the slewing effect on the phase servo performance.

Dual Slope Model

Consider an interferometer with a sine modulation imposed between the two interfering beams. The modulation would take the form shown below:

$$M(t)=A \sin(2\pi t+W), \qquad [4]$$

where t is in cycles and A is in radians.

The radian modulation amplitude M(t) depends upon the sine radian amplitude A, the time t in cycles and the phase of the modulation W. As disclosed above, the resulting carrier is sampled at least five times during each of two portions of one cycle giving at least ten total samples per cycle of modulation. The sampled portions of the cycle, which are the two pulse times, will each be a fraction, $\tau$, of a modulation cycle wide. The sample times in cycles are given below in terms of the pulse index: n, and the sample index: k.

$$t_{n,k} = \frac{n}{2} + (k-2)\frac{\tau}{5} \qquad [5]$$

where $\pi$ is in units of a fraction of a cycle and k always goes from 0 to 4 for each pulse n.

The resulting samples of the carrier optical power are shown below where R(t) is the signal of interest.

$$S_{n,k}=P(t_{n,k})=2P_0\{1+\cos[M(t_{n,k})+R(t_{n,k})]\} \qquad [6]$$

For dual slope demodulation to work, the carrier samples must be spaced $\pi/2$ radians apart in the cycle fraction $\tau$. This requirement is met when the following relationship holds.

$$M(t_{n,k+1})-M(t_{n,k})=\pm\frac{\pi}{2} \qquad [7]$$

The four constraints derived according to the above relationship starting from the first pulse when n is equal to zero are shown below:

$$A\left\{\sin\left[-2\pi\frac{\tau}{5}+W\right]-\sin\left[-2\pi\frac{2\tau}{5}+W\right]\right\}=\frac{\pi}{2}; \qquad [8.1]$$

$$A\left\{\sin[\ W\ ]-\sin\left[-2\pi\frac{\tau}{5}+W\right]\right\}=\frac{\pi}{2}; \qquad [8.2]$$

$$A\left\{\sin\left[2\pi\frac{\tau}{5}+W\right]-\sin[\ W\ ]\right\}=\frac{\pi}{2}; \text{ and} \qquad [8.3]$$

$$A\left\{\sin\left[2\pi\frac{2\tau}{5}+W\right]-\sin\left[2\pi\frac{\tau}{5}+W\right]\right\}=\frac{\pi}{2}. \qquad [8.4]$$

Upon examination, those skilled in the art recognize that these four constraints cannot be satisfied simultaneously. However, if the optical pulse cycle fraction, $\tau$, is small, the small angle approximation to the sine yields the required modulation amplitude in radians for optical pulse cycle fraction, $\tau$:

$$A_0=\frac{5}{4\tau}. \qquad [9]$$

The modulation with a small cycle fraction is shown below with scaling multiplier, d, a multiplier that is nominally equal to one:

$$M(t)=d\frac{5}{4\tau}\sin[2\pi t+W] \qquad [10]$$

where t is in cycles and pulse time, $\tau$, is a fraction of a modulation cycle.

As disclosed above, there are preferably ten samples of the carrier per modulation cycle for the preferred embodiment. The first five will occur during the positive slope of the modulation and then five more will be taken during the negative slope. The samples are described below:

| Positive Slope | Carrier | Modulation | Negative Slope | Carrier | Modulation |
|---|---|---|---|---|---|
| S0 | P(-2τ/5) | -π | S5 | P(½ - 2τ/5) | π |
| S1 | P(-τ/5) | -π/2 | S6 | P(½ - τ/5) | π/2 |
| S2 | P(0) | 0 | S7 | P(½) | 0 |
| S3 | P(τ/5) | π/2 | S8 | P(½ + τ/5) | -π/2 |
| S4 | P(2τ/5) | π | S9 | P(½ + 2τ/5) | -π |

The positive slope samples {S0, S1, S2, S3, S4} provide one measure of the cosine and sine of the signal, R(t):

$$\cos(R_{PSS})=2S2-S4-S0; \qquad [11.1]$$

$$\sin(R_{pss})=2(S1-S3); \qquad [11.2]$$

and $$R_{PSS}=\tan^{-1}(\sin(R_{PSS})/\cos(R_{PSS}))+\text{fringe}. \qquad [11.3]$$

So, from the positive slope samples $R_{PSS}$ is demodulated as follows:

$$R_{PSS}=\tan^{-1}[2(S1-S3)/(2S2-S4-S0)]+\text{fringe}. \qquad [11.4]$$

The term fringe in equations 11.3 and 11.4 refers to the ability of the demodulation approach to count and track fringes. This fringe counting approach is accomplished by the demodulator remembering the previous value of the signal angle R(t) the last time it was measured, from the previous modulation slope. The previous value is subtracted from the new value and if the difference is greater than pi radians, the fringe counter is decremented by one. If the difference is less than minus pi radians, the fringe counter is incremented by one. This fringe counting approach is monotonic subject to the constraint that the rate of R(t) does not exceed pi radians per consecutive demodulation slopes. As shown in equations 11.3 and 11.4, and subsequently in the remainder of this disclosure, the fringe count, fringe is concatenated 181 to, or otherwise augmenting, the value of R(t) 184 allowing for an approach yielding a very large dynamic range measurement 183.

The negative slope samples provide a second measure of the cosine and the sine of the signal R(t):

$$\cos(R_{NSS})=2S7-S5-S9; \qquad [12.1]$$

$$\sin(R_{NSS})=2(S8-S6) \qquad [12.2]$$

$$R_{NSS}=\tan^{-1}(\sin(R_{NSS})/\cos(R_{NSS}))+\text{fringe}. \qquad [12.3]$$

So, from the negative slope samples $R_{NSS}$ is demodulated as follows:

$$R_{NSS}=\tan^{-1}[2(S8-S6)/(2S7-S5-S9)]+\text{fringe}. \qquad [12.4]$$

The truer measure of the signal, R(t) 184, during the modulation cycle cancels the modulation artifact and is the sum of the above two derived measurements:

$$R(t)=\frac{1}{2}(R_{PSS}+R_{NSS}), \qquad [13.1]$$

Accordingly, a corrected version output phase 184, is provided at a rate of every two pulses, or half the rate of the pulse light source. Where the fidelity of the corrected output phase is not required or when phase and amplitude corrections have worked to bring $R_{PSS}$ and $R_{NSS}$ negligibly close to one another, both $R_{PSS}$ and $R_{NSS}$ individually are usable as the output phase 184, R. In these conditions, the present invention provides the output phase 184, R, at every pulse, that is, at the same rate as the pulse light source. The output rate being equal to the pulse rate can also be maintained with successive demodulated slope samples replacing latched previous values as they become available. For example, for optical pulse number j, $$R(j)=\frac{1}{2}(R_{PSS}(j-1)+R_{NSS}(j)), j=\text{integer}, \qquad [13.2]$$

Other averaging and filtering techniques known to those skilled in the art can be applied depending on application and data throughput requirements.

The modulation phase error, which is the necessary correction to W to re-center the sine modulation zero crossing with respect to pulses, is given by the difference of the signal measurements:

$$W_e=\frac{1}{2}(R_{PSS}-R_{NSS}). \qquad [13.3]$$

The amplitude, A, of the modulation signal M(t) is adjusted so that adjacent samples are taken at modulation levels that are maintained at π/2 radians separation. The error terms in the modulation amplitude A, EM, from the positive slope samples, $EM_P$, are:

$$EM_{P,0} = S1 - S2 + S3 - S4, \text{ quadrant 0;} \quad [14.1]$$

$$EM_{P,1} = S0 - S1 + S2 - S3, \text{ quadrant 1;} \quad [14.2]$$

$$EM_{P,2} = EM_{P,0} = -S1 + S2 - S3 + S4, \text{ quadrant 2;} \quad [14.3]$$

and $$EM_{P,3} = -EM_{P,1} = -S0 + S1 - S2 + S3, \text{ quadrant 3.} \quad [14.4]$$

The corresponding modulation amplitude error terms for the negative slope samples, $EM_N$, are:

$$EM_{N,0} = -S5 + S6 - S7 + S8, \text{ quadrant 0;} \quad [15.1]$$

$$EM_{N,1} = -S6 + S7 - S8 + S9, \text{ quadrant 1;} \quad [15.2]$$

$$EM_{N,2} = -EM_{N,0} = +S5 - S6 + S7 - S8, \text{ quadrant 2;} \quad [15.3]$$

and $$EM_{N,3} = -EM_{N,1} = +S6 - S7 + S8 - S9, \text{ quadrant 3.} \quad [15.4]$$

Dual Slope Performance—Linear Approximation

Figure 8:
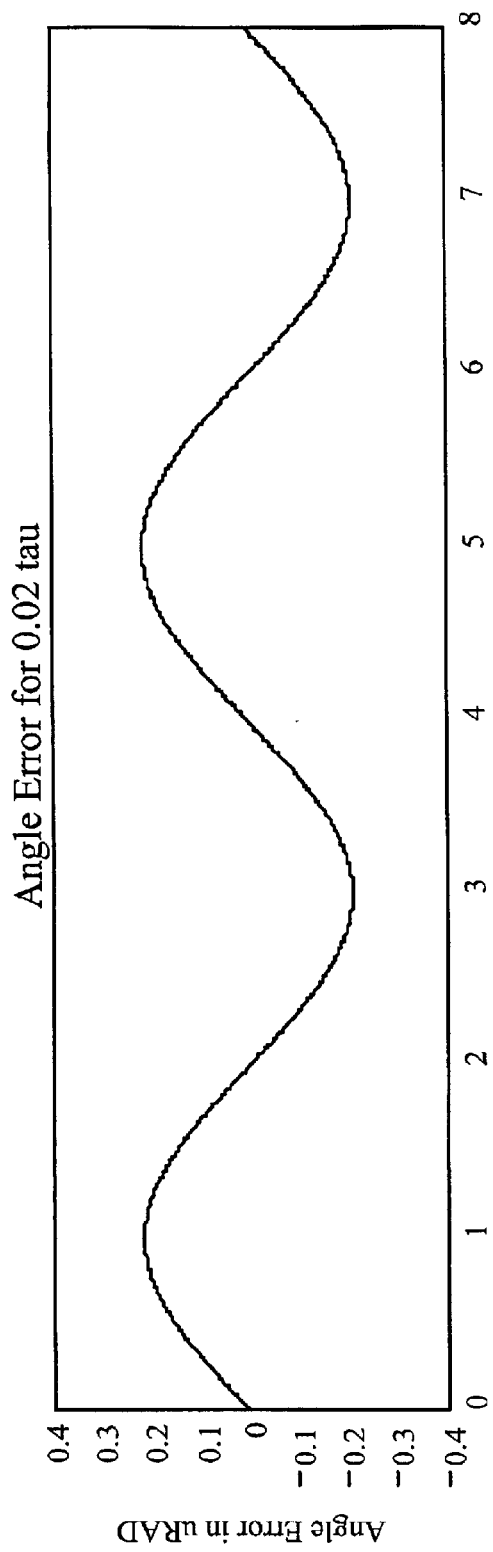
FIG. 8 illustrates the angle error versus cycle through the unit circle.

There will be a fundamental error in dual slope demodulation due to the approximation of a linear modulation ramp using the preferred embodiment sine modulation zero crossing region. Using a one microsecond optical pulse with a 20 KHz carrier, which gives a cycle fraction of 0.02, yields the angle errors shown in FIG. 8.

Figure 9:
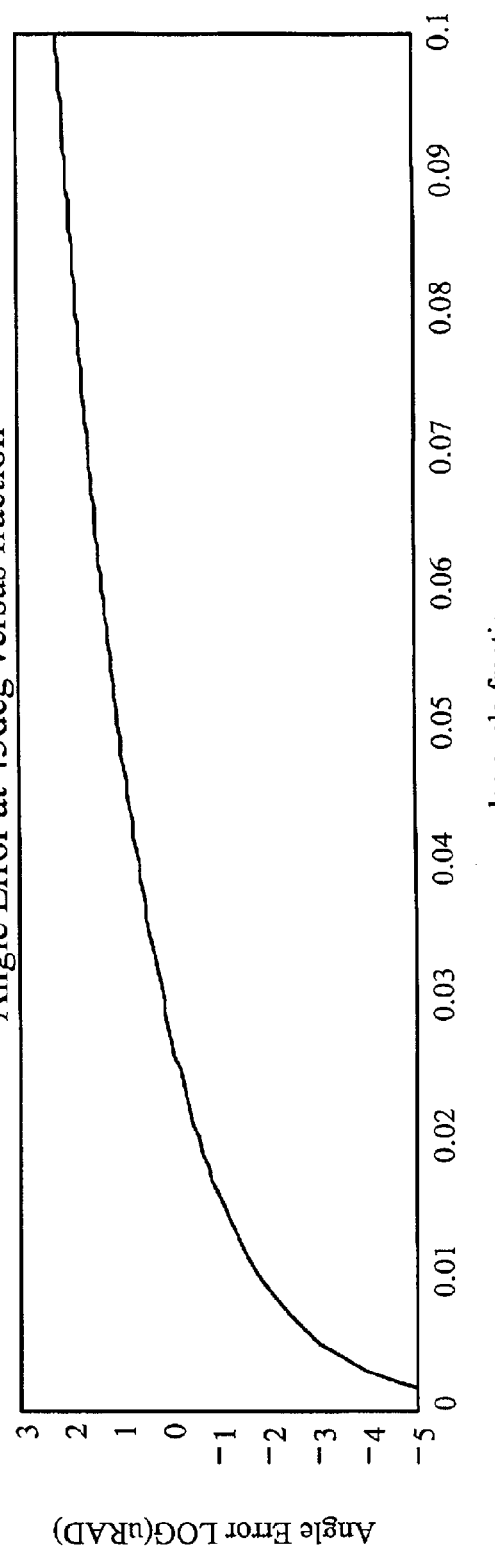
FIG. 9 illustrates the log of the angle error versus pulse cycle fraction.

This angle error over the unit circle is typical of eccentricity type errors and is greatest at the 45-degree octant boundaries. Using this point, the angle error: $R_{output} - R_{input}$, is plotted versus the cycle fraction in FIG. 9 using a LOG scale. The error is about 10 μrad at a cycle fraction of 0.05 and goes up to 100 μrad at 0.09 and down to 1 μrad at 0.03 fraction of a cycle. This error does not include the effects of the depth or phase servos and should not be interpreted as an RMS value.

Dual Slope Performance—Modulation Phase

Figure 10A:
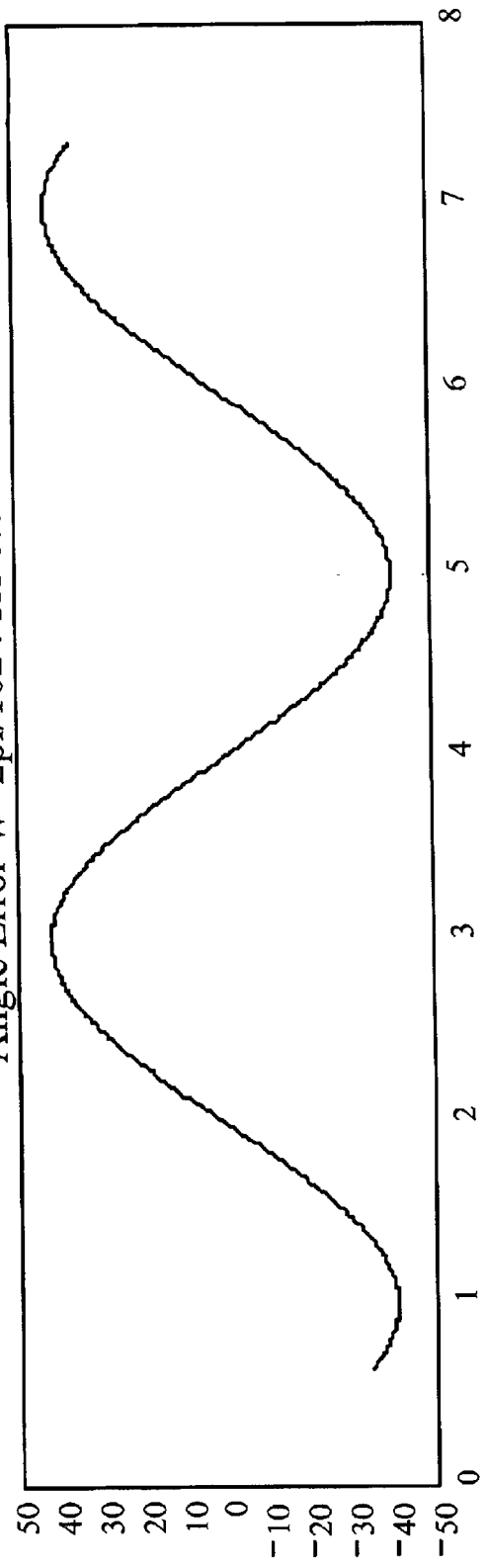
FIGS. 10A–10B shows the angle error in microradians for a modulation phase error of one part in 210 of a cycle and the combined error respectively.

In addition to exploiting the linear approximation of the sine modulation in the preferred embodiment, dual slope demodulation must center two pulses on the two zero crossings of one modulation cycle. If the two pulses are not on both of the modulation zero crossings, an error in the angle will result. FIG. 10A shows the angle error in microradians for a modulation phase error of one part in 210 of a cycle. This figure illustrates about an 80 μrad peak to peak error for a very small modulation phase shift. However, it does not indicate the actual situation. The angle error shown in FIG. 10A is derived by adding the positive and negative slope angle measurements. Inspecting the measurements individually, one finds they directly scale a modulation bias level error into an angle error as described above. The scale factor of angle radians per modulation phase radians can be readily determined as the derivative of the modulation. That is, $$\frac{dR}{dW} = \frac{dM}{dW} = \frac{5}{4\tau}. \quad [16]$$

For a 0.02 cycle fraction, this gives a scale factor of 62.5, which transforms a modulation phase error of one part in $2^{10}$ of a cycle into 0.38 radians of one-sided angle error. The opposite slope demodulation reverses the sign of this error so it is not seen when the two sides are added. Phase noise between the positive and negative slopes of the modulation is affected by the scale factor and thus greatly increases the noise in the output angle.

Figure 10B:
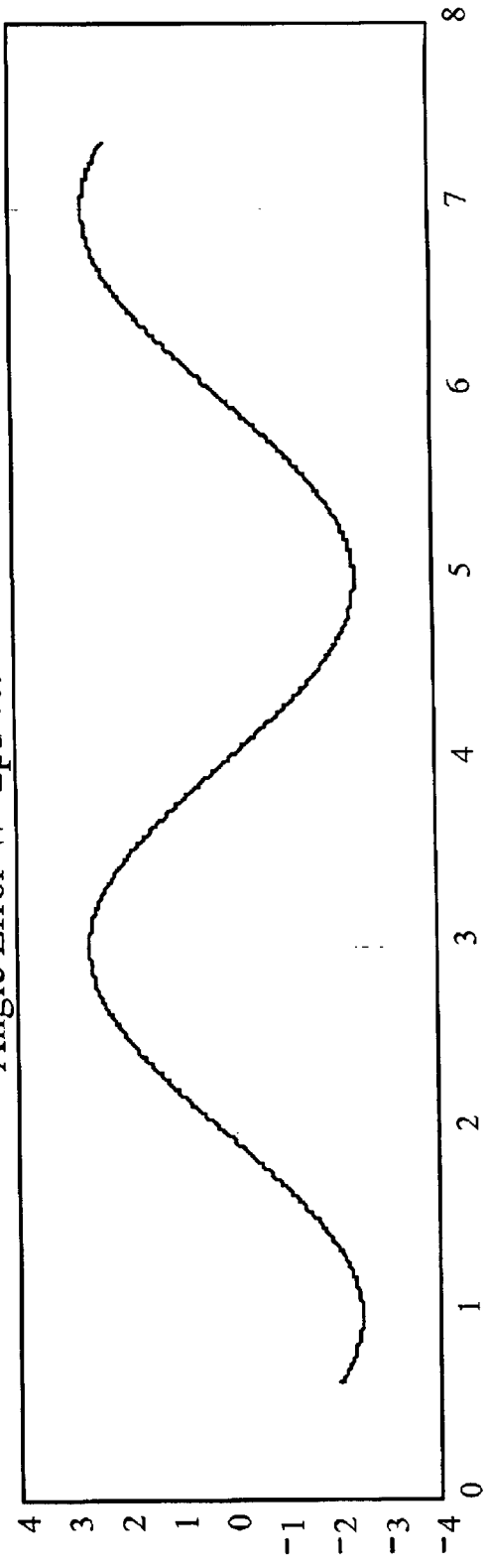
Figure 11:
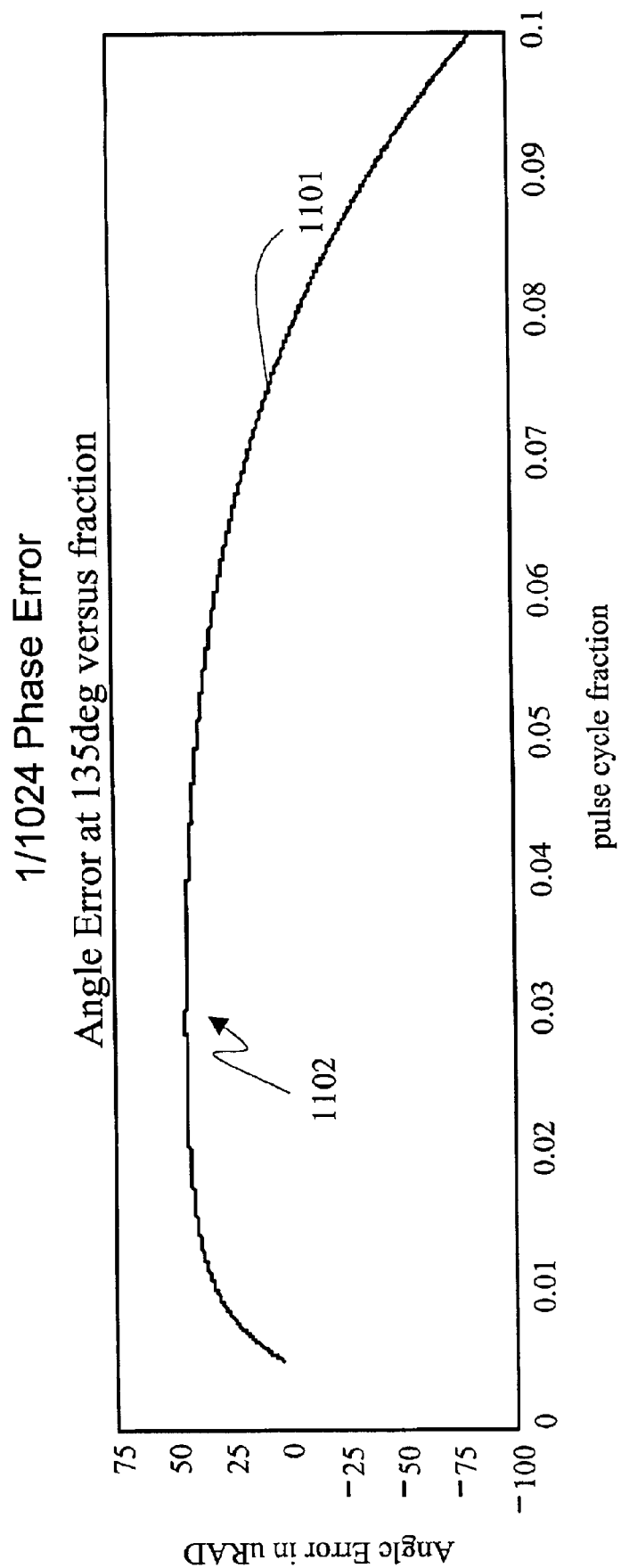
FIG. 11 illustrates the angle error dependence on the cycle fraction.

For a 10 μrad system operating at a 0.02 cycle fraction, the phase of the modulation is adjusted with a twelve-bit time base. The resulting combined error in the angle is shown in FIG. 10B. Changing the cycle fraction operating value is a tradeoff. Smaller values will increase the effect of modulation or sample phase errors on the measurement of the angle. But larger values will increase the error due to the linear approximation of the preferred embodiment sine modulation zero crossing. These two errors have an opposite dependence on the size of the cycle fraction. The effect can be seen in FIG. 11 illustrating the angle error dependence on the cycle fraction where there is a one part in 1024 phase error. The error dependence 1101 is flat around the 0.03 cycle fraction point 1102.

Modulation Phase Servo

Figure 12:
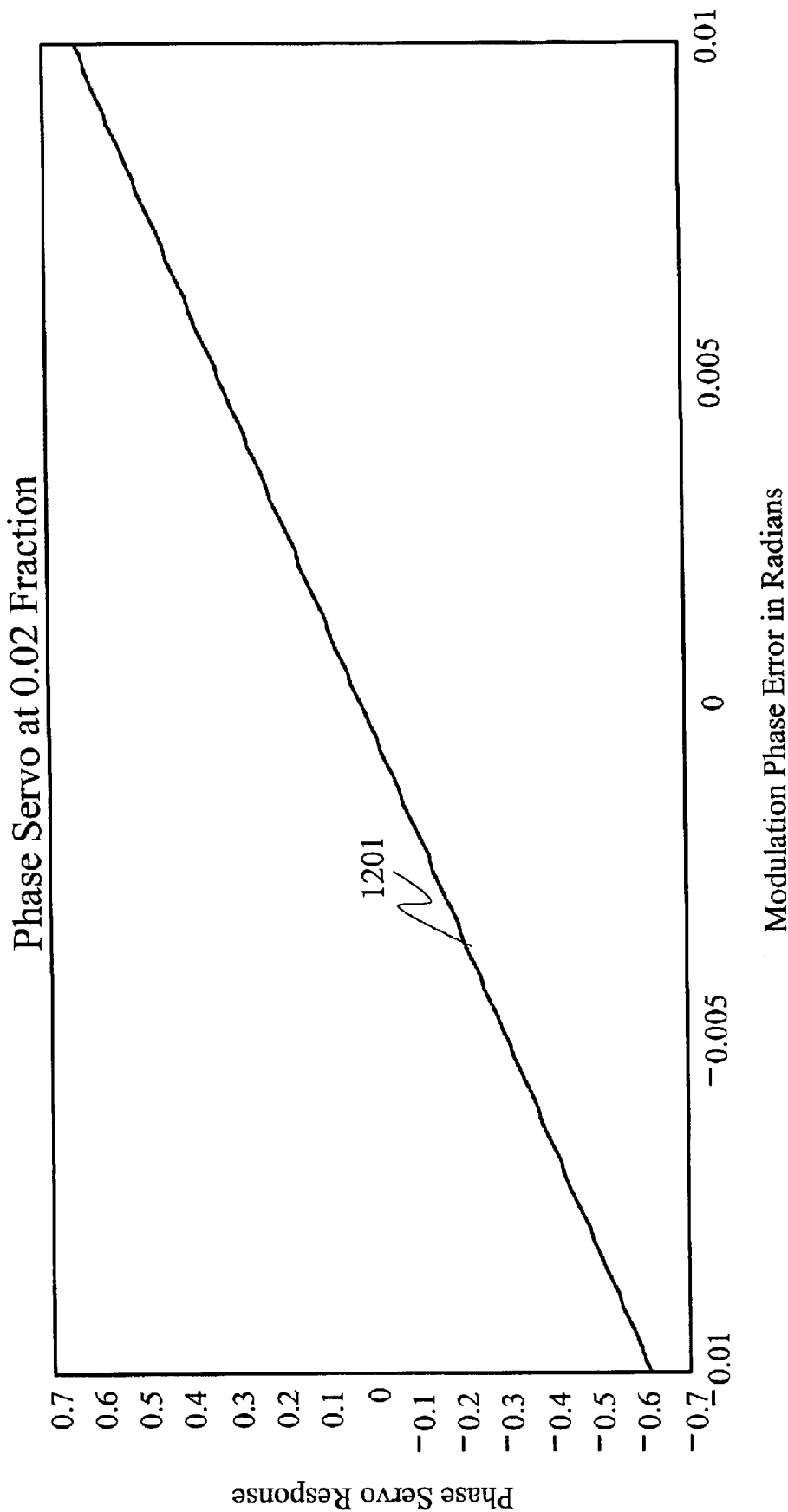
FIG. 12 illustrates the servo response to changes in the modulation phase.

The modulation phase servo is seen to be critical to the dual slope demodulation system due to the effect of a modulation phase errors on the angle errors. The servo response to changes in the modulation phase is shown in FIG. 12 for a 0.02 pulse cycle fraction. The phase servo response is linear 1201 and has a high gain since it has the same scale factor as that of the measured angle R. The phase servo error, EW, gain is:

$$\frac{d\delta L}{dW} = \frac{dR}{dW} = \frac{5}{4\tau}. \quad [17]$$

The phase servo error δL is measured by taking the difference between the measured angles at the positive and negative cycle slopes. This means that the phase servo error includes the derivative of the angle taken over a half cycle. This term will fold the angle variation into the phase servo that must be preferably low pass filtered to reduce the effect of the angle variation on the phase servo error.

Figure 13:
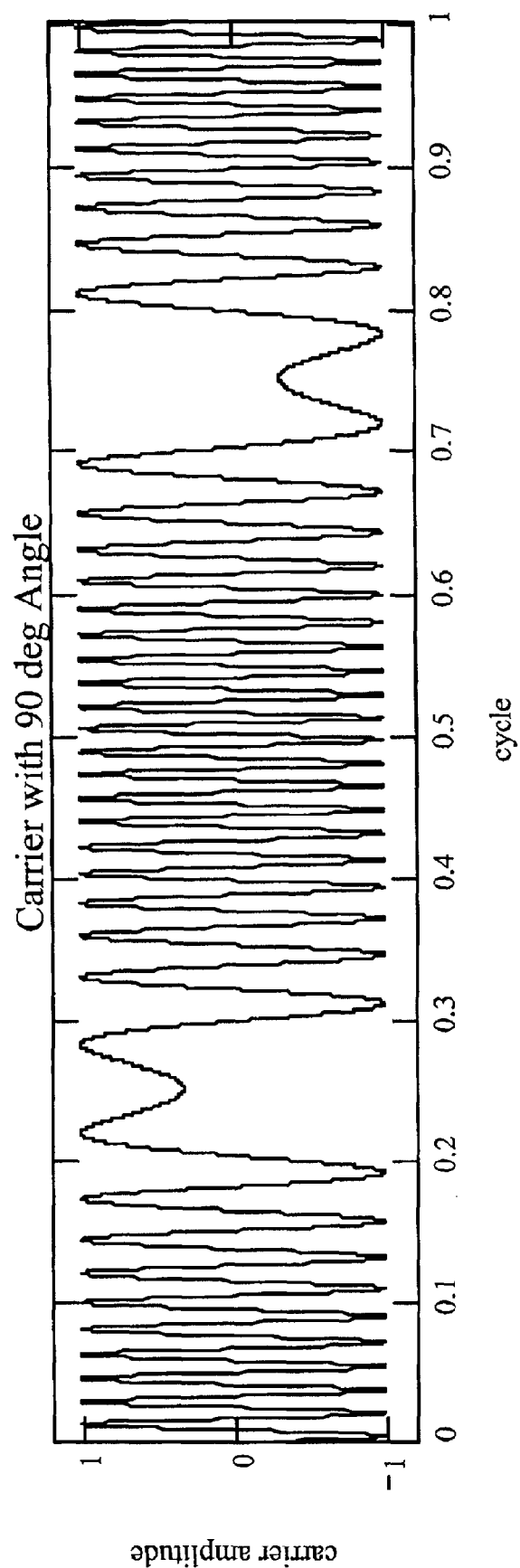
FIG. 13 illustrates the carrier for a 0.02 cycle fraction during one modulation cycle
Figure 14A:
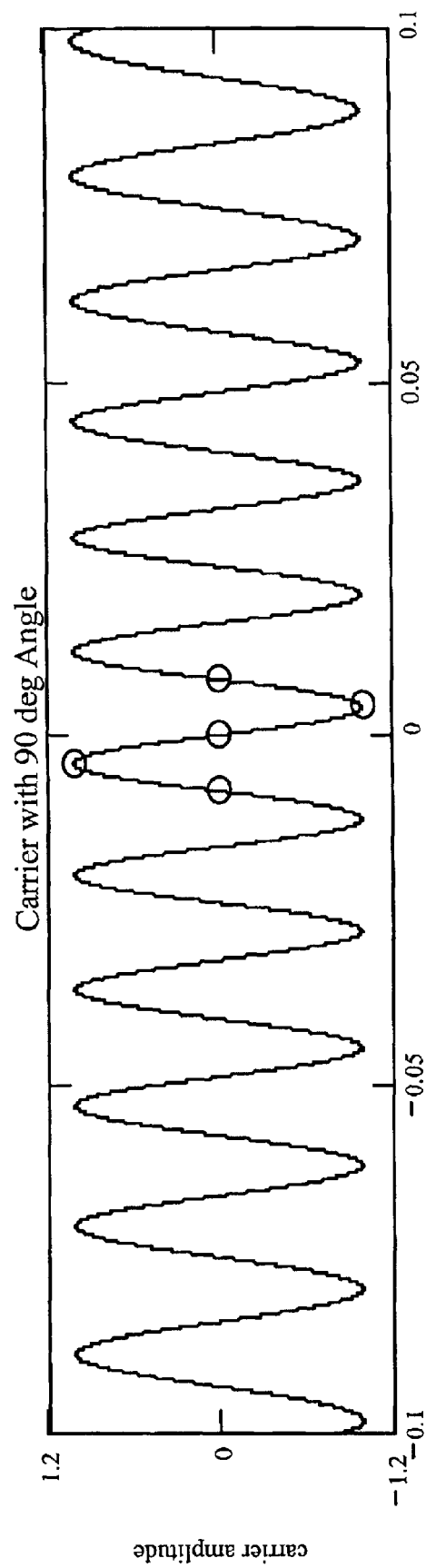
FIGS. 14A–B illustrate the sampled carrier at both points 0 and for 0.5 respectively when optimally sampled at the zero crossings of the modulation.
Figure 14B:
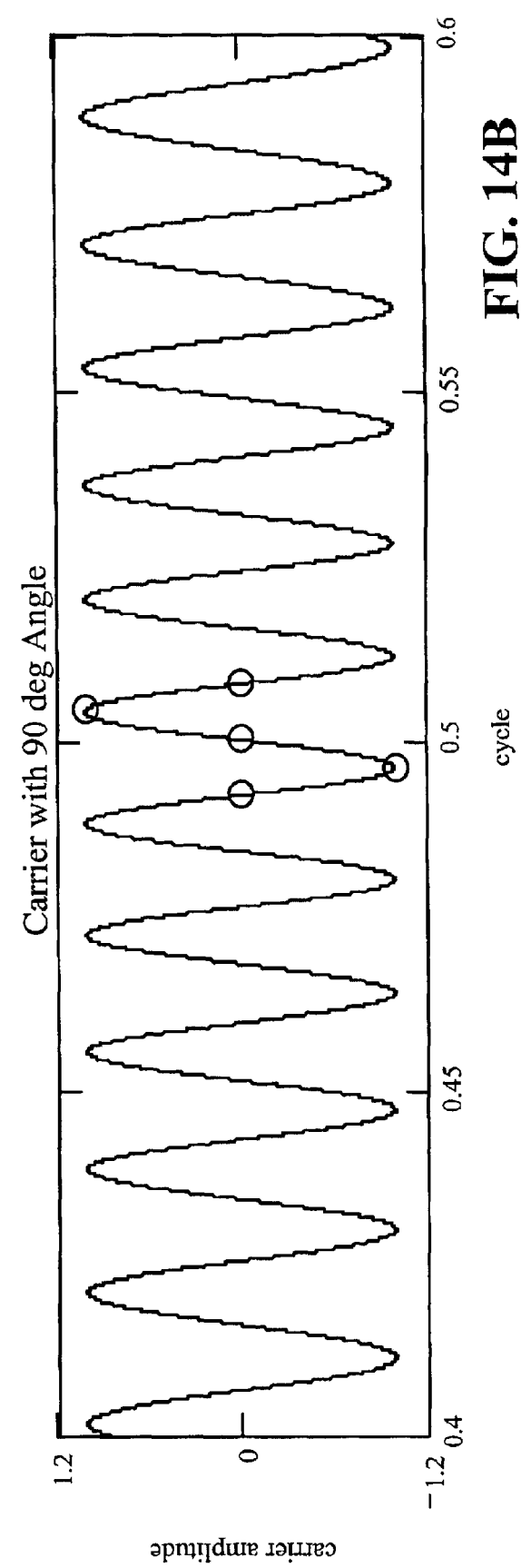

The phase servo has another challenge. Because of the large gain, a 0.016 cycle error in the modulation phase setting will shift the bias by one full cycle. The result will be that the positive and negative measures of the angle will be one fringe off from the true zero phase error condition. Since the initial fringe setting is arbitrary, the servo will never find the zero crossings. For example, the carrier for a 0.02 cycle fraction during one modulation cycle is shown in FIG. 13. This carrier is optimally sampled at 0 and 0.5 where the zero crossings of the modulation occur. The sampled carrier at both points is shown in FIG. 14A for 0 and FIG. 14B for 0.5. Adding an illustrative modulation phase error of 0.016 cycle produces the sampled carrier illustrated in FIG. 15A for 0 and FIG. 15B for 0.5.

The servo will not be able to identify the fringe shift so the error from the linear sine approximation will increase. However, the dual slope demodulation process will still operate correctly, although with slightly higher distortion of the signal of interest. The optimum operating points of 0 and 0.5 can be found through an initialization procedure by closely inspecting the carrier of FIG. 13 and aligning the pulses midway between the frequency turn around points at 0.25 and 0.75.

Modulation Depth Servo

Figure 16:
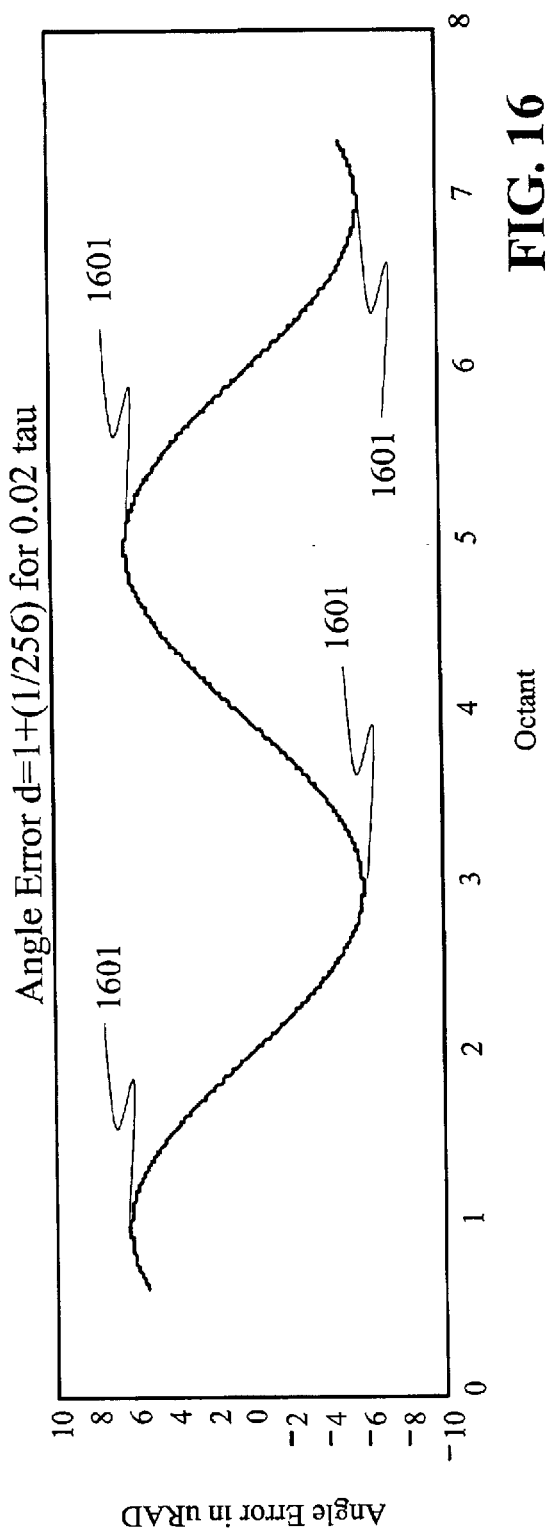
FIG. 16 illustrates the maximum error in the angle error produced by an eight-bit modulation amplitude adjustment.

Adjusting the amplitude of the sine modulation will vary the slope of the zero crossings and change the modulation excursion during the optical pulse time. This modulation slope must be π/2 radians between samples. An eight-bit modulation amplitude adjustment would give the maximal error in the angle shown in FIG. 16. This has a typical eccentricity error form and is a maximum at the π/4 points 1601. An eight-bit modulation amplitude adjustment meets a 10 μrad requirement.

Figure 17:
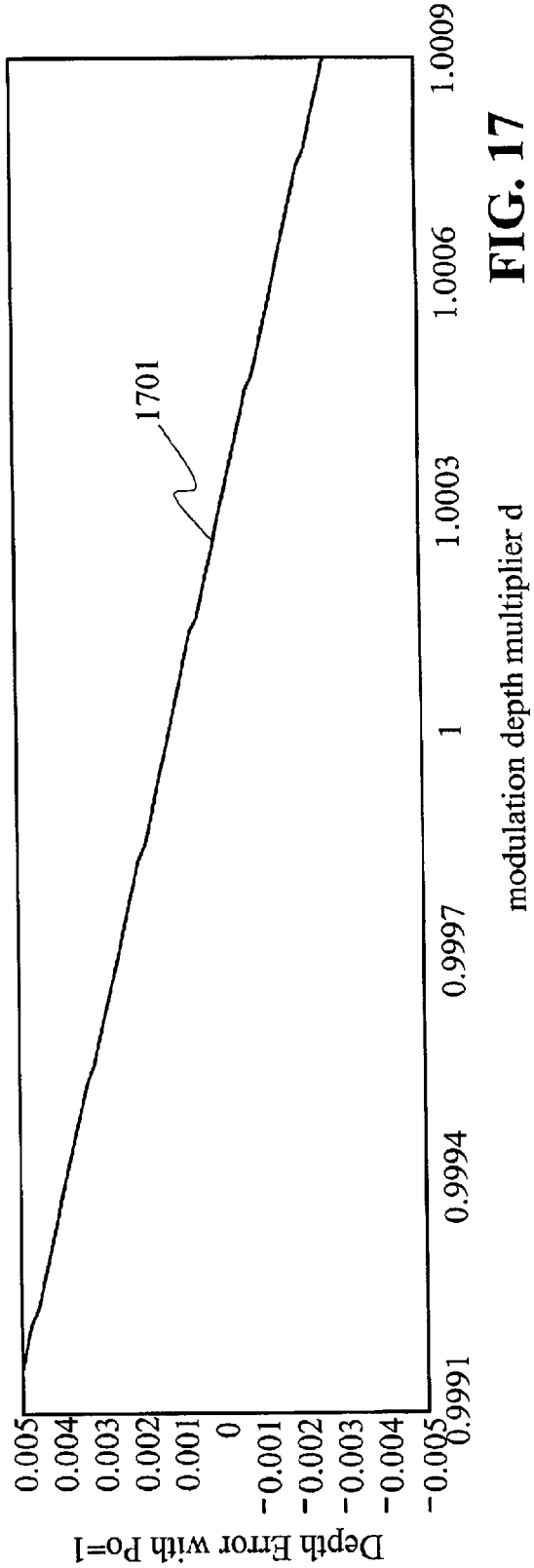
FIG. 17 illustrates servo depth error with a π/4 input angle plotted against the amplitude-scaling factor.
Figure 18:
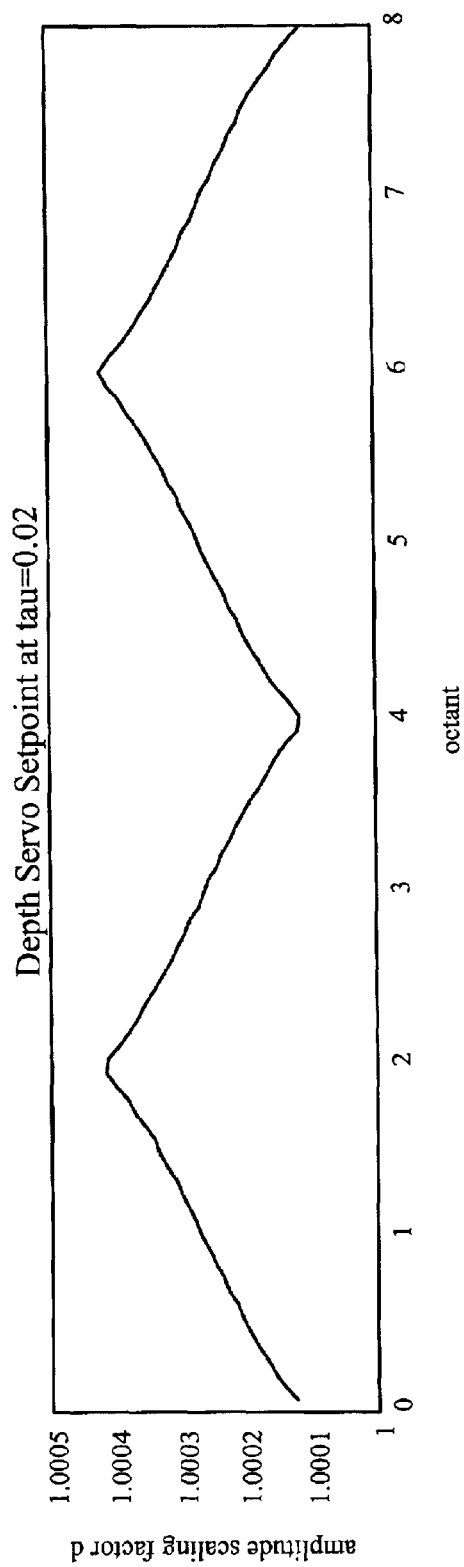
FIG. 18 illustrates the depth servo zero point versus the angle octant.
Figure 19:
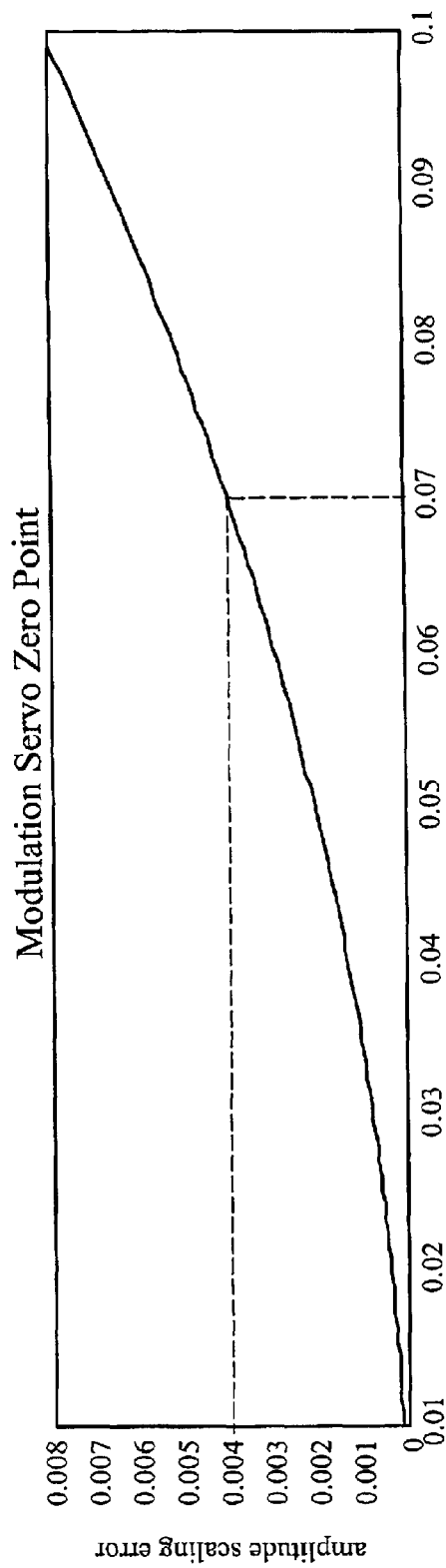
FIG. 19 illustrates a plot of the amplitude scaling factor versus the cycle fraction.

The modulation depth servo will drive the depth error, EM, to zero. However, this may not be where the amplitude scaling factor, d, is exactly one. The scaling factor multiplies the modulation amplitude that has been initialized to be the correct value given a linear approximation of the preferred embodiment sine modulation. The nonlinear nature of the sine zero crossing will perturb the servo zero point. FIG. 17 illustrates an example at a π/4 input angle of the depth servo error plotted against the amplitude-scaling factor. The servo error crosses zero 1701 at d=1.000263. This offset is not important, but suggests a closer look at the depth servo characteristics is needed to be sure that the scaling factor's deviation from unity will not increase the distortion significantly. For instance, the depth servo zero point is plotted versus the angle octant in FIG. 18. FIG. 18 shows that the depth servo zero point depends on the input angle and varies the scaling multiplier, d, by 0.0003, an amount that is equal to an eleven to twelve bit control resolution for the 0.02 cycle fraction. This means that the error is small enough to be neglected for practical implementations. The maxima and minima occur at 0 and π/2 multiples, respectively. FIG. 19 illustrates a plot of the amplitude scaling factor, d, versus the cycle fraction. FIG. 19 shows that the depth servo set point peak-to-peak deviation around the unit circle increases as the cycle fraction increases. At a cycle fraction of 0.07, the deviation is equal to a modulation amplitude control resolution of eight bits where the error becomes significant for a 10 μrad system. Thus, using a modulation amplitude control resolution of twelve bits will allow the operation of a 10 μrad system for all practical values of pulse fractions.

Figure 20:
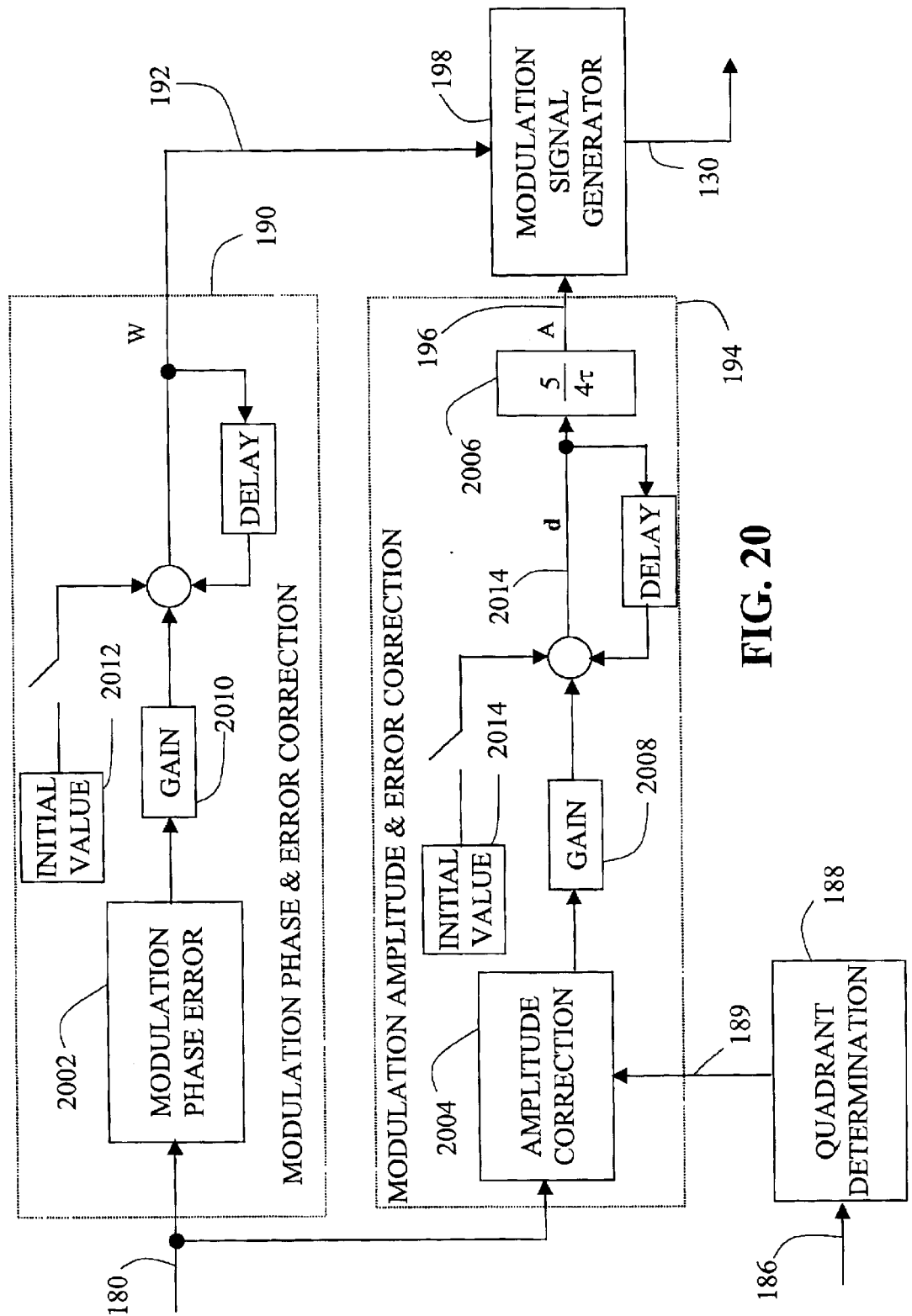
FIG. 20 is a functional block diagram of the modulation amplitude and error correction and the modulation phase and error correction of the present invention.

The disclosure of the mechanization of the preferred embodiment continues with FIG. 20. A quadrant generator 188 supports 189 the modulation amplitude and error correction 194. Samples {S0, S1, S2, S3, S4, S5, S6, S7, S8, S9} 180 are provided to both the modulation amplitude and error correction 194 and the modulation phase and error correction 190.

As part of the modulation phase error 2002, the dual slope modulation phase error is determined and filtered where:

$$W_\epsilon = \frac{1}{2}(R_{PSS} - R_{NSS})$$ [18]

is mechanized as $$W_\epsilon = \frac{1}{2}\{[\tan^{-1}[2(S1-S3)/(2S2-S4-S0)] + \text{fringe}] - [\tan^{-1}[2(S8-S6)/(2S7-S5-S9)] + \text{fringe}]\}.$$ [19]

Then, the signal $W_\epsilon$ is run through a low pass filter to reduce folding the angle variation in the phase servo, producing the signal $W_{\epsilon\text{-filtered}}$. This is then passed through a gain 2010 and added to the digital integrator that has been set to an initial value 2012 producing the optimum modulation phase 192. Alternative embodiments of the filter and digital integrator topology include an α-filter, an α-β filter and other well known digital versions of higher order digital filters with fixed and/or time-varying parameters including Kalman filters.

As part of the amplitude correction 2004, the Dual Slope modulation amplitude error is determined and filtered. The modulation amplitude error for the positive slope pulse is determined as:

$A_{eP} = EM_{P,0}$ for quadrant 0; [20.1]

$A_{eP} = EM_{P,1}$ for quadrant 1; [20.2]

$A_{eP} = EM_{P,2}$ for quadrant 2; and [20.3]

$A_{eP} = EM_{P,3}$ for quadrant 3. [20.4]

The modulation amplitude error for the negative slope pulse is determined as:

$A_{eN} = EM_{N,0}$ for quadrant 0; [21.1]

$A_{eN} = EM_{N,1}$ for quadrant 1; [21.2]

$A_{eN} = EM_{N,2}$ for quadrant 2; and [21.3]

$A_{eN} = EM_{N,3}$ for quadrant 3. [21.4]

Then $A_{eP}$ and $A_{eN}$ are added to produce the amplitude error for one modulation cycle and the sum is run through a low pass filter to reduce folding the angle variation in the amplitude servo, producing $A_{e\text{-filtered}}$. This is then passed through a gain 2008 and added to the digital integrator that has been set to an initial value 2014 producing the optimum modulation amplitude 196 after scaling by the conversion factor 2006. Alternative embodiments of the filter and digital integrator topology include an α-filter, an α-β filter and other well known digital versions of higher order digital filters with fixed and/or time-varying parameters including Kalman filters.

Quadrant determination 188 uses products 186 of the demodulation 182 of FIG. 1. Quadrant determination 188 is performed by logical inspection, within the unit circle, of the location of the positive slope angle, $R_{PSS}$, for the positive slope amplitude error, $A_{eP}$, and the negative slope angle, $R_{NSS}$, for the negative slope amplitude error, $A_{eN}$.

From the modulation phase and error correction 190 and the modulation amplitude and error correction 194, the modulation M(t) is determined and generated by the modulation signal generator 198. This is then used to drive the phase modulator 128 (FIG. 1) by the output 130 of the generator 198.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

In addition to the equivalents of the claimed elements, obvios substitutions now or later known to one with ordinary skill in the art are defined to be with the scope of the defined elements.

The claim are thus to be understood to include what is specifically illustrated and described above, what is conceptually equivalent, what can be obviously substituted and also what essentially incorporates the essential idea of the invention.

What is claimed is:

1. An apparatus for determining the phase of signal pulses which comprises:
   (a) a compensator; said compensator comprising a coupler, a delaying path and a modulating path; said delaying path comprising a delaying means and a reflector; said modulating path comprising a phase modulator and a reflector; whereby light pulses from a pulse light source are bifurcated and directed simultaneously by said coupler into said delay path and said modulating path and reflections from said delay path and said modulating path are combined by said coupler as pulse pairs;

(b) one or more interferometers;

(c) one or more optical receivers for converting the incoming light signals into electrical signals (d) a bi-directional coupling device for directing pulse pairs from said coupler to said one or more interferometers and for directing reflections from said one or more interferometers to said one or more optical receivers;

(e) a digitizer for sampling the electrical signals exiting said one or more optical receivers in a fashion synchronous with the pulse light source;

(f) a modulation signal generator; said modulation signal generator outputting a dual slope waveform comprised of alternating positive and negative slopes of equal magnitude for commanding said phase modulator in a fashion synchronous with the digitizer;

(g) a demodulation means for cycle quadrant determination and output phase determination using the digitized electrical signals from both positive and negative modulation slopes;

whereby output phase of signal pulses are determined by the demodulation of the digitized electrical signals.

2. The apparatus for determining the phase of signal pulses as claimed in claim 1 wherein said phase modulator is a piezoelectric transducer-driven winding of fiber.

3. The apparatus for determining the phase of signal pulses as claimed in claim 1 wherein said reflector of the modulating path is a Faraday Reflector mirror.

4. The apparatus for determining the phase of signal pulses as claimed in claim 1 wherein said bi-directional coupling device is a bi-directional coupler.

5. The apparatus for determining the phase of signal pulses as claimed in claim 1 wherein said bi-directional coupling device is an optical circulator.

6. The apparatus for determining the phase of signal pulses as claimed in claim 1 wherein said one or more interferometers comprise a linear array of interferometers.

7. The apparatus for determining the phase of signal pulses as claimed in claim 1 wherein said optical receiver is a polarization diversity receiver.

8. The apparatus for determining the phase of signal pulses as claimed in claim 7 wherein said polarization diversity receiver comprises an optical splitter and a plurality of receivers.

9. The apparatus for determining the phase of signal pulses as claimed in claim 1 wherein the modulation signal generator comprises a waveform generator, a digital-to-analog converter and a modulation driver.

10. The apparatus for determining the phase of signal pulses as claimed in claim 1 wherein the modulation signal generator creates a dual slope waveform of adjustable phase and amplitude.

11. The apparatus for determining the phase of signal pulses as claimed in claim 10 wherein the dual slope waveform of adjustable phase and amplitude is a sine wave of adjustable phase and amplitude.

12. The apparatus for determining the phase of signal pulses as claimed in claim 10 wherein the dual slope waveform of adjustable phase and amplitude is a triangle wave of adjustable phase and amplitude.

13. The apparatus for determining the phase of signal pulses as claimed in claim 1 further comprising a fringe generator; said fringe generator operably maintaining and updating fringe values by reading successive values from the demodulation means for cycle quadrant determination thereby determining fringe crossings, whereby said fringe generator adds or subtracts $2\pi$ radians to a preceding fringe value depending on the respective direction of fringe crossing.

14. The apparatus for determining the phase of signal pulses as claimed in claim 13 further comprising a modulation signal phase correction means for converting, samples of five or more points about the positive slope of the zero crossing of the electrical signals and samples of five or more points about the negative slope of the zero crossing of the electrical signals thereby determining the phase error from one-half the difference of the demodulated signal phase angle of the negative slope samples as augmented by said fringe generator and demodulated signal phase angle of the positive samples as augmented by said fringe generator, respectively.

15. The apparatus for determining the phase of signal pulses as claimed in claim 14 wherein said modulation signal amplitude correction means converts samples of five or more points about a positive slope of a zero crossing of the electrical signals and samples of five or more points about a negative slope of successive zero crossings of the electrical signals thereby determining amplitude error per slope sign and per cycle quadrant by summing positive slope amplitude error and negative slope amplitude error, each respectively determined from the positive slope samples and the negative slope samples respectively, where quadrant determination is performed by logically inspecting the location within the unit circle of the demodulated positive slope phase angle for the positive slope amplitude error and the demodulated negative slope phase angle for the negative slope amplitude error.

16. The apparatus for determining the phase of signal pulses as claimed in claim 15 wherein the demodulation means for output phase determination provides one-half the sum of the demodulated positive slope phase angle, as augmented by the fringe generator, and the demodulated negative slope phase angle, as augmented by the fringe generator.

17. The apparatus for determining the phase of signal pulses as claimed in claim 15 wherein the demodulation means selects alternately from the demodulated positive slope phase angle and the demodulated negative slope phase angle based on five or more samples of the electrical signals about the positive slope of a zero crossing and five or more samples of the electrical signals about the negative slope respectively of a successive zero crossing alternately, each adjusted by the concatenation of fringe, whereby measurements of R(t) are output at twice the rate over an average of the two relationships.

18. The apparatus for determining the phase of signal pulses as claimed in claim 15 wherein the demodulation means for output phase determination provides alternately the demodulated positive slope phase angle followed by the demodulated negative slope phase angle based on five or more samples of the electrical signals about the positive slope of a zero crossing and five of more samples of the electrical signals about the negative slope of a successive zero crossing, each respectively concatenated with fringe, whereby the pulse rate of the source light pulse and the output phase rate of the apparatus are the same.

19. The apparatus for determining the phase of signal pulses as claimed in claim 13 further comprising a modulation signal phase correction means for converting samples of five points about the positive slope of the zero crossing of the electrical signals and samples of five points about the negative slope of the zero crossing of the electrical signals thereby determining the phase error according to the following relationship:

$$W_e = \tfrac{1}{2}\{[\tan^{-1}[2(S1-S3)/(2S2-S4S0)]+\text{fringe}]-[\tan^{-1}[2(S8-S6)/(2S7-S5-S9)]+\text{fringe}]\}.$$

20. The apparatus for determining the-phase of signal pulses as claimed in claim 19 wherein said modulation signal amplitude correction means converts samples of five points about a positive slope of a zero crossing of the electrical signals and samples of five points about a negative slope of successive zero crossings of the electrical signals thereby determining the amplitude error per slope sign and per cycle quadrant according to the following eight relationships:

$$EM_{P,0}=S1-S2+S3-S4, \text{ quadrant 0;}$$

$$EM_{P,1}=S0-S1+S2-S3, \text{ quadrant 1;}$$

$$EM_{P,2}=-EM_{P,0}=-S1+S2-S3+S4, \text{ quadrant 2;}$$

and $$EM_{P,3}=-EM_{P,1}=-S0+S1-S2+S3, \text{ quadrant 3;}$$

and $$EM_{N,0}=-S5+S6-S7+S8, \text{ quadrant 0;}$$

$$EM_{N,1}=-S6+S7-S8+S9, \text{ quadrant 1;}$$

$$EM_{N,2}=-EM_{N,0}=+S5-S6+S7-S8, \text{ quadrant 2;}$$

and $$EM_{N,3}=-EM_{N,1}=+S6-S7+S8-S9, \text{ quadrant 3;}$$

where cycle quadrant determination is performed by logically inspecting the location of the demodulated positive slope phase angle for the positive slope amplitude error and the demodulated negative slope phase angle for the negative slope amplitude error and whereby, as a function of cycle quadrant, the prefiltered amplitude error is determined by $EM_N+EM_P$.

21. The apparatus for determining the phase of signal pulses as claimed in claim 20 wherein the demodulation means for output phase determination provides alternately the demodulated positive slope phase angle, as augmented by the fringe generator, followed by the demodulated negative slope phase angle, as augmented by the fringe generator, based on five samples of the electrical signals about the positive slope of a zero crossing as follows:

$$R(t)=\tan^{-1}[2(S1-S3)/(2S2-S4-S0)]+\text{fringe}$$

and five samples of the electrical signals about the negative slope of a successive zero crossing as follows:

$$R(t)=\tan^{-1}[2(S8-S6)/(2S7-S5-S9)]+\text{fringe}$$

whereby the pulse rate of the source light pulse and the output phase rate of the apparatus are the same.

22. The apparatus for determining the phase of signal pulses as claimed in claim 20 wherein the demodulation means for output phase determination provides one-half the sum of the demodulated positive slope phase angle, as augmented by the fringe generator, and the demodulated negative slope phase angle, augmented by the fringe generator, based on five samples of the electrical signals about the positive slope of a zero crossing and five sample of the electrical signals about the negative slope of a successive zero crossing as follows:

$$R(t)=\frac{1}{2}\{[\tan^{-1}[2(S1-S3)/(2S2-S4-S0)]+\text{fringe}]+[\tan^{-1}[2(S8-S6)/(2S7-S5-S9)]+\text{fringe}]\}.$$

respectively, whereby measurements of R(t) are output at twice the rate over an average of the two relationships.

23. A method of determining the phase of signal pulses which comprises the steps of:
   (a) dividing each light pulse from a pulse light source into first and second divided pulses;
   (b) modulating each first divided pulse with at least one slope via an initial and reflected pass through a fiber path producing a modulated path length; said modulated path being effected by a phase modulator;
   (c) delaying in time each second divided pulse relative to the first pulse via an initial and reflected pass through a length of fiber;
   (d) combining each reflected modulated first pulse and each reflected delayed second pulse to form a pulse pair;
   (e) transmitting each pulse pair to one or more interferometers;
   (f) transmitting return signals of each pulse pair from the one or more interferometers;
   (g) collecting the returned pulse pairs;
   (h) converting the collected pulse pairs into receiver-generated electrical signals;
   (i) digitally sampling the receiver-generated electrical signals;
   (j) demodulating the sampled electrical signals for cycle quadrant determination and phase determination to the unit circle;
   (k) determining the cycle quadrant;
   (l) tracking fringe crossings using successively determined cycle quadrants and determining fringe count;
   (m) determining the fringe by multiplying the fringe count by $2\pi$; and
   (n) determining the output phase by adding the unit circle determined phase to the determined fringe.

24. The method for determining the phase of signal pulses as claimed in claim 23, the step of collecting the returned pulse pairs further comprises the steps of splitting the collected light signals into a plurality of optical paths, filtering each resulting split optical path with polarizers of differing polarization orientations, such that at least one of the filtered paths has a high interferometric visibility.

25. The method of determining the phase of signal pulses as claimed in claim 23 after the step of determining the cycle quadrant, the method further comprising the step of adjusting modulation phase of the phase modulator using five positive and five negative slope sampled electrical signals respectively.

26. The method of determining the phase of signal pulses as claimed in claim 25, wherein the step of adjusting modulation phase of the phase modulator comprises the steps of:
   (a) generating a phase error from the sampled electrical signals according to the relationship:

$$W_e=\frac{1}{2}\{[\tan^{-1}[2(S1-S3)/(2S2-S4-S0)]+\text{fringe}]-[\tan^{-1}[2(S8-S6)/(2S7-S5-S9)]+\text{fringe}]\};$$

(b) filtering the phase error; and
   (c) blending the filtered phase error with the most current prior value of the modulation phase of the phase modulator;
whereby pulse samples are substantially centered about the zero crossings of the positively and negatively sloped portions of the modulated signal.

27. The method of determining the phase of signal pulses as claimed in claim 23 after the step of determining the cycle quadrant, the method further comprising the step of adjusting modulation amplitude of the phase modulator using the determined cycle quadrant and the sampled electrical signals.

28. The method of determining the phase of signal pulses as claimed in claim 27, wherein the step of adjusting modulation amplitude of the phase modulator comprises the steps of:

(a) determining, as function of cycle quadrant, a first part of the amplitude error from the five or more samples taken about the zero crossing of the positively-sloped portion of the modulated signal according to following relationship:

$EM_{P,0} = S1 - S2 + S3 - S4$, quadrant 0;

$EM_{P,1} = S0 - S1 + S2 - S3$, quadrant 1;

$EM_{P,2} = -EM_{P,0} = -S1 + S2 - S3 + S4$, quadrant 2;

and $EM_{P,3} = -EM_{P,1} = -S0 + S1 - S2 + S3$, quadrant 3;

(b) determining, as function of cycle quadrant, a second part of the amplitude error from the five or more samples taken about the successive zero crossing of the negatively-sloped portion of the modulated signal according to following relationship:

$EM_{N,0} = -S5 + S6 - S7 + S8$, quadrant 0;

$EM_{N,1} = -S6 + S7 - S8 + S9$, quadrant 1;

$EM_{N,2} = -EM_{N,0} = +S5 - S6 + S7 - S8$, quadrant 2;

and $EM_{N,3} = -EM_{N,1} = +S6 - S7 + S8 - S9$, quadrant 3;

(c) combining the first and second parts of the amplitude error to produce the amplitude error for one modulation cycle;

(d) filtering the phase error; and (e) blending the filtered phase error with the most current prior value of the modulation amplitude of the phase modulator;

whereby amplitudes of the modulated signal are maintained and with the amplitude maintenance, positive and negative values of the modulated signal zero crossings are properly determined.

29. The method of determining the phase of signal pulses as claimed in claim 23, the method further comprising the step of determining the output phase according to the following relationship:

$R(t) = \frac{1}{2}\{[\tan^{-1}[2(S1-S3)/(2S2-S4-S0)] + \text{fringe}] + [\tan^{-1}[2(S8-S6)/(2S7-S5-S9)] + \text{fringe}]\}$.

30. The method of determining the phase of signal pulses as claimed in claim 23, the method further comprising the step of determining the output phase according to the following alternating relationships:

$R(t) = \tan^{-1}[2(S1-S3)/(2S2-S4-S0)] + \text{fringe}$ for the positive slope pulse and its associated output phase angle, followed by $R(t) = \tan^{-1}[2(S8-S6)/(2S7-S5-S9)] + \text{fringe}$ for the negative slope pulse and associated output phase angle, whereby the pulse rate of the source light pulse and the output phase rate of the apparatus are substantially the same.

31. The method of determining the phase of signal pulses as claimed in claim 23 wherein the step of digitally sampling the receiver-generated electrical signals comprises sampling five or more samples corresponding to a zero crossing of a positively sloping portion of the modulated signal, sampling five or more signals corresponding to a successive zero crossing of a negatively sloping portion of the modulated signal.

32. The method of determining the phase of signal pulses as claimed in claim 31, after the step of determining the cycle quadrant, the method further comprising the step of adjusting modulation phase of the phase modulator using five or more positive and five or more negative slope sampled electrical signals respectively.

33. The method of determining the phase of signal pulses as claimed in claim 32, the step of adjusting modulation phase of the phase modulator comprises the steps of:

(a) generating a phase error from the sampled electrical signals by taking one-half of the difference between the demodulated positive slope phase angle, as augmented by the determined fringe, and the demodulated negative slope phase angle, as augmented by the determined fringe;

(b) filtering the phase error; and (c) blending the filtered phase error with the most current prior value of the modulation phase of the phase modulator;

whereby pulse samples are substantially centered about the zero crossings of the positively and negatively sloped portions of the modulated signal.

34. The method of determining the phase of signal pulses as claimed in claim 31, after the step of determining the cycle quadrant; the method further comprising the step of adjusting modulation amplitude of the phase modulator using the determined cycle quadrant and the sampled electrical signals.

35. The method of determining the phase of signal pulses as claimed in claim 34, the step of adjusting modulation amplitude of the phase modulator comprises the steps of:

(a) converting samples of five or more points about a positive slope of a zero crossing of the electrical signals and samples of five or more points about a negative slope of successive zero crossings of the electrical signals thereby determining amplitude error per slope sign and per cycle quadrant by summing positive slope amplitude error and negative slope amplitude error, each respectively determined from the positive slope samples and the negative slope samples respectively, thereby producing the amplitude error for one modulation cycle where quadrant determination is performed by logically inspecting the location within the unit circle of the demodulated positive slope phase angle for the positive slope amplitude error and the demodulated negative slope phase angle for the negative slope amplitude error;

(b) filtering the phase error; and (c) blending the filtered phase error with the most current prior value of the modulation amplitude of the phase modulator;

whereby amplitudes of the modulated signal are maintained and with the amplitude maintenance, positive and negative values of the modulated signal zero crossings are determined.

36. The method of determining the phase of signal pulses as claimed in claim 31, the method further comprising the step of determining the output phase using five or more positive and five or more negative slope sampled electrical signals respectively by taking one-half of the sum of the demodulated positive slope phase angle, as augmented by the determined fringe, and the demodulated negative slope phase angle, as augmented by the determined fringe.

37. The method of determining the phase of signal pulses as claimed in claim 31, the method further comprising the step of determining the output phase by alternately:

(a) demodulating five or more positive slope sampled electrical signals, concatenating the demodulated negative slope with fringe, and providing the demodulated positive slope phase angle with concatenated fringe and (b) demodulating five or more negative slope sampled electrical signals, concatenating the demodulated negative slope with fringe, and then providing the demodulated negative slope phase angle with concatenated fringe, whereby the pulse rate of the source light pulse and the output phase rate of the apparatus are substantially the same.

* * * * *